(12) United States Patent
Obrist et al.

(10) Patent No.: US 12,070,768 B2
(45) Date of Patent: Aug. 27, 2024

(54) PISTON, CARTRIDGE AND METHOD OF VENTING A CARTRIDGE

(71) Applicant: Sulzer Mixpac AG, Haag (CH)

(72) Inventors: Manfred Obrist, Lustenau (AT); Philipp Seiler, Au (CH); Renato Brunner, Dornbirn (AT)

(73) Assignee: MEDMIX SWITZERLAND AG, Haag (CH)

( * ) Notice: Subject to any disclaimer, the term of this patent is extended or adjusted under 35 U.S.C. 154(b) by 354 days.

(21) Appl. No.: 17/464,759

(22) Filed: Sep. 2, 2021

(65) Prior Publication Data

US 2021/0394227 A1 Dec. 23, 2021

Related U.S. Application Data

(63) Continuation-in-part of application No. 16/772,891, filed as application No. PCT/EP2018/084967 on Dec. 14, 2018, now Pat. No. 11,154,887.

(30) Foreign Application Priority Data

Dec. 20, 2017 (EP) ..................................... 17209087
Sep. 13, 2018 (EP) ..................................... 18194346

(51) Int. Cl.
*B05C 17/00* (2006.01)
*B05B 11/00* (2023.01)
(Continued)

(52) U.S. Cl.
CPC .... *B05C 17/00579* (2013.01); *B05B 11/0039* (2018.08); *B05B 11/0054* (2013.01);
(Continued)

(58) Field of Classification Search
CPC ........... B05B 17/00579; B05B 11/0039; B05B 11/0054; B05B 11/0078; B05B 11/02;
(Continued)

(56) References Cited

U.S. PATENT DOCUMENTS

| 4,452,370 A | 6/1984 | Langensiepen et al. |
| 5,722,830 A | 3/1998 | Brandhorst et al. |

(Continued)

FOREIGN PATENT DOCUMENTS

| EP | 0004100 A1 | 9/1979 |
| EP | 1722709 B1 | 7/2010 |

(Continued)

OTHER PUBLICATIONS

International Search Report issued Feb. 21, 2019 in corresponding International Patent Application No. PCT/EP2018/084967, filed Dec. 14, 2018.

*Primary Examiner* — Ishal Pancholi
(74) *Attorney, Agent, or Firm* — GLOBAL IP COUNSELORS, LLP

(57) ABSTRACT

A two-component piston for a cartridge includes a piston cover and a piston body. The piston cover has a radially extending attachment portion, a rear side and a front side. The piston body includes a front side and a rear side. The rear side of the piston cover is arranged adjacent to at least a part of the front side of the piston body and includes a valve member configured and arranged to be received within the piston body and to extend into the piston body towards the rear side of the piston body. The piston cover moves relative to the piston body upon actuation of the valve member, and the piston cover is non-releasably connected to the piston body by a part of the piston body being overmolded to the radially extending portion of the attachment portion of the piston cover.

19 Claims, 16 Drawing Sheets

(51) Int. Cl.
- *B05B 11/02* (2023.01)
- *B05C 17/005* (2006.01)
- *B29C 45/16* (2006.01)
- *B29L 31/00* (2006.01)

(52) U.S. Cl.
CPC .......... *B05B 11/0078* (2013.01); *B05B 11/02* (2013.01); *B29C 45/1657* (2013.01); *B29C 2045/1601* (2013.01); *B29L 2031/7494* (2013.01)

(58) Field of Classification Search
CPC ............. B05B 11/0044; B05B 12/1418; B29C 45/1657; B29C 2031/7494; B29C 2045/1668; B29C 2045/167; B05C 17/00553; B29K 2067/006; B29K 2077/00
USPC ......................................................... 222/135
See application file for complete search history.

(56) References Cited

U.S. PATENT DOCUMENTS

| | | |
|---|---|---|
| 5,878,922 A | 3/1999 | Boring |
| 5,950,880 A | 9/1999 | Garcia |
| 6,375,045 B1 | 4/2002 | Ki |
| 6,598,766 B1 | 7/2003 | Brugner |
| 7,028,865 B2 | 4/2006 | Heukamp |
| 7,891,528 B2 | 2/2011 | Costa et al. |
| 8,511,350 B2 | 8/2013 | Turner |
| 8,641,426 B2 | 2/2014 | Yang |
| 9,144,821 B2 | 9/2015 | Obrist |
| 9,242,784 B2 | 1/2016 | Buck et al. |
| 10,543,508 B2 | 1/2020 | Obrist |
| 2007/0119868 A1 | 5/2007 | Kraemer |
| 2007/0164047 A1 | 7/2007 | Reidt et al. |
| 2007/0172789 A1 | 7/2007 | Muller et al. |
| 2010/0147896 A1 | 6/2010 | Obrist |
| 2010/0200617 A1 | 8/2010 | Schar |
| 2010/0294795 A1 | 11/2010 | Boehm |
| 2011/0089200 A1 | 4/2011 | Reuter |
| 2011/0146836 A1 | 6/2011 | Turner |
| 2012/0061424 A1 | 3/2012 | Obrist |
| 2012/0247323 A1 | 10/2012 | Obrist |
| 2012/0258422 A1 | 10/2012 | Leiner et al. |
| 2014/0208939 A1 | 7/2014 | Frey |
| 2016/0288159 A1 | 10/2016 | Seifer |

FOREIGN PATENT DOCUMENTS

| | | |
|---|---|---|
| EP | 2221257 A1 | 8/2010 |
| EP | 2998030 A1 | 3/2016 |
| JP | 2007-502241 A | 2/2007 |
| WO | 03/050012 A1 | 6/2003 |
| WO | 2016/193157 A1 | 12/2016 |

PISTON, CARTRIDGE AND METHOD OF VENTING A CARTRIDGE

CROSS-REFERENCE TO RELATED APPLICATION

This application is a continuation-in-part application of U.S. patent application Ser. No. 16/772,891, filed Jun. 15, 2020, which is a U.S. National Stage Application of International Application No. PCT/EP2018/084967, filed Dec. 14, 2018, which claims priority to European Patent Application No. 17209087.0, filed Dec. 20, 2017 and European Patent Application No. 18194346.5, filed Sep. 13, 2018, the contents of each of which are hereby incorporated herein by reference.

BACKGROUND

Field of the Invention

The present invention relates to a piston for a cartridge, to a cartridge and to a method of venting a cartridge.

Background Information

A wide variety of ways of dispensing masses from cartridges is known in the prior art. The masses can be a so-called one-component mass, this means single component materials that e.g. harden via a chemical reaction which is brought about either by an external energy source, such as UV light or heat, or e.g. due to moisture etc. present in the surroundings of the position of application. Typical applications of one component materials can be found e.g. in the dental field or in the building industry, for example to bond products such as windows and concrete elements, or to provide seals between different components.

Another known type of mass is a multi-component mass. The materials to be dispensed are typically a matrix material and a hardener. The filled cartridges come in different ratios referred to as 1:1, 2:1, 4:1 and 10:1 etc., the numbers specifying the ratios of the amounts of each of the two materials that are to be dispensed. The reason for these different ratios is to allow a wide variety of different compositions to be mixed and dispensed. For example, some compositions require more hardener and some require less hardener. Also some compositions require more mixing. Mixing tips are known from the prior art which are adapted to mix the compositions as they exit the cartridge.

Two-component materials are typically used in the dental field as impression materials, e.g. on the formation of dental impressions, as a cement material for prosthetic restorations, as a temporary cement for trial cementing restorations or for cementing temporary crowns.

Further applications of two-component materials are present in the building industry where they are e.g. used as a replacement for mechanical joints that corrode over time. Adhesive bonding can be used to bond products such as windows and concrete elements. The use of multi-component materials as protective coatings, for example, in the form of moisture barriers, corrosion protection and anti-slip coatings, is also becoming increasingly common. Examples of flowable materials which can be used are, for example, distributed by the company Coltene using the tradename AFFINIS® or by the company DMG using the tradename PermaCem. One-component and multi-component materials are frequently very expensive and thus it is desired to increase the storage life of these materials, particularly if the cartridges and the materials are designed not just for a single use, but such that they can be used a multiple amount of times over considerable periods of time of e.g. days, weeks or even months.

SUMMARY

In order to increase the storage time of the components, the cartridges to be filled have to be made from materials which do not react with the masses stored therein. Moreover, the cartridges have to be clean, i.e. they should not include any water residue etc., in particular in connection with the storage of single component masses. On filling the cartridges, the cartridges are typically filled either via their outlet with the piston already being positioned in the cartridge or the cartridge is filled from the end where the piston is normally received before the installation of the piston. In both cases air can be trapped between the piston and the material to be stored therein. This air can lead to a reaction of the materials present in the cartridge and hence reduce the storage life of the materials present in the cartridge.

Moreover, during the manufacture of two-component pistons comprising a piston cover separate from a piston body, problems are sometimes encountered in use of the pistons.

Some of these problems arise due to an insufficient attachment of the piston cover at the piston body, this leads to an insufficient seal being present between the piston cover and the piston body. An insufficient seal can allow air to arrive in the cartridge and hence reduce the life time of the components stored in the cartridge.

If the valve pin is not operated correctly, then residual air present in the cartridge in the region of the piston cover after filling cannot be vented correctly from the filled cartridge. This residual air can also reduce the life time of the components stored in the cartridge.

In view of the foregoing it is an object of the invention to provide a piston which facilitates an improved storage lifetime of a cartridge once filled with a component. It is a further object of the present invention to provide a piston which facilitates the venting of air present from a cartridge. It is a further object of the present invention to improve the attachment of the piston cover to the piston valve.

This object is satisfied by a piston as described herein.

Such a two-component piston is designed for use in a cartridge, and comprises a piston cover as the first component and a piston body as the second component, wherein the piston has a first side and a second side, wherein a rear side of the piston cover is arranged adjacent to at least a part of the piston body, wherein a front side of the piston cover is arranged at the first side, wherein the rear side of the piston cover comprises a valve member, in particular a valve pin, the valve member being configured and arranged to be received within the piston body and to extend into the piston body towards the second side, wherein the piston cover is configured to be moved relative to the piston body on actuation of the valve member and wherein the piston cover is non-releasably connected to the piston body, wherein the non-releasable connection is formed by a part of the piston body extending through an attachment portion of the piston cover.

By forming a part of the piston body such that it projects through an attachment portion of the piston cover an improved connection between the piston cover and the piston body is achieved that ensures a correct attachment of the piston cover at the piston body.

Due to the design of the non-releasable connection, the attachment of the piston cover to the piston body is improved and the problems associated with the attachment of the piston cover at the piston body can be avoided.

In this way a piston is made available by which the storage lifetime of the components stored in the cartridge can be further improved.

A two-component piston is advantageously used since this, on the one hand, enables a venting of air present at the first side of the piston between the first side and a material stored in a filled cartridge.

On the other hand, the piston body and the piston cover can be formed from different materials, so that the piston body and the piston cover can be tailored to the specific uses of each component. For example, the piston cover can be made from a material which is harder than that of the piston body, and which is also less likely to react with the components stored in the cartridge. This can extend the life time of the piston and hence the storage life of components stored in the piston. At the same time the piston body that e.g. comprises the sealing lip can be made from a soft material, such as PE (polyethylene), that reliably ensures a seal between the piston and a cartridge wall due to the materials used.

Preferably the piston cover comprises at least two attachment portions for the non-releasable connection between the piston cover and the piston body; and wherein the piston body comprises at least two parts each respectively extending through a respective one of the at least two attachment portions. Forming two or more attachment portions ensures a more uniform attachment of the piston cover at the piston body. This more uniform attachment of the piston cover at the piston body ensures a more uniform lifting of the piston cover from the piston body during venting of air from the filled cartridge and hence facilitates the venting of air present from a cartridge.

It is preferred if the at least two attachment portions are arranged such that they face one another. In this way the two or more attachment portions are arranged symmetrically with respect to one another. If two attachment portions are provided they are arranged opposite one another.

Advantageously the attachment portion projects from the piston cover at least generally in the direction of the second side. By forming the attachment portion such that it projects from the piston cover it does not interfere with the piston cover in use of the piston.

Preferably the attachment portion comprises an aperture, preferably wherein the aperture has an at least generally rectangular shape. The use of an aperture enables a part of the piston body to extend through the piston cover and hence facilitates the attachment of the piston cover to the piston body.

It is preferred if the part of the piston body that extends through the attachment portion at least substantially completely fills an internal space of the aperture. By forming the part of the piston body that extends through the attachment portion such that it completely fills an internal space of the aperture the amount of clearance present between the attachment portion and the part of the piston body extending therethrough is significantly reduced ensuring a more tight attachment and hence less play between the two components, thereby further improving the attachment of the piston cover at the piston body.

Advantageously the attachment portion is at least partly, preferably completely, received in the piston body. Forming the attachment portion such that it is received in the piston body means it does not interfere with the front side of the piston cover in use of the piston.

Preferably the part of the piston body that extends through the attachment portion and the remaining part of piston body are integrally formed, preferably in an injection molding process. Injection molding processes are cost effective and suitable for mass production of small parts.

It is preferred if the attachment portion and the piston cover are integrally formed, preferably in an injection molding process. Integrally forming the attachment portion and the piston cover ensures that a sufficient connection is present between these parts to enable the function of these parts in use during storage of components in a cartridge and the venting of a cartridge during the filling procedure.

Advantageously the part of the piston body that extends through the attachment portion and the remaining part of the piston body are integrally formed around and adjacent to the attachment portion and adjacent to the remaining parts of the piston cover. Thereby the complete attachment portion is engaged by the piston body improving the connection between the piston body and the attachment portion.

Preferably the part of the piston body that extends through the attachment portion is formed by a web of material that extends through the attachment portion, with the web of material being non-releasably connected to two sections of the piston body, optionally with the two sections of the piston body being disposed on either side of the attachment portion, and preferably with the web of material being formed from the same material as the piston body. This type of design ensures a compact realisation of the non-releasable connection that is simple to manufacture and effective in use.

It is preferred if the piston body comprises an annular groove at the first side, wherein the piston cover extends into the annular groove and up to a base of the annular groove, and wherein the attachment portion projects from the base of the annular groove into the piston body. A piston comprising an annular groove can be vented in an improved manner in comparison to pistons not comprising such a groove. Providing the attachment portion such that it is present at the base of the groove and projects away from the piston cover at the base of the groove ensures that the attachment portion does not interfere with the piston cover in use.

Advantageously the base of the annular groove of the piston body comprises a recess in which at least a part of the attachment portion is received. This is a beneficial design of the piston that ensures not only an attachment between the piston and the piston cover, but also permits a suitable vent between these components.

Preferably the piston cover comprises a central region and a side portion, with the side portion extending from the central region at least generally in the direction of the second side and preferably into the annular groove and up to the base of the annular groove, wherein the front side of the side portion comprises at least one recess and preferably has an undulated surface at the front side.

Providing a piston cover having a recess and an undulated surface in the region of the side portions ensures improved handling of the piston cover while this is used as part of a mold for piston body the during the manufacture of the piston body.

In a further aspect of the present invention this relates to a cartridge comprising an outlet, at least one chamber and at least one piston in accordance with the teaching presented herein, with one piston being arranged in each chamber, the cartridge preferably further comprising a respective flowable mass arranged in each of the at least one chambers. The advantages discussed in the foregoing in relation to the piston likewise hold true for the cartridge.

It is preferred if a cartridge comprises a respective flowable mass arranged in each of the at least one chambers. Typical dispensing systems have volumes for the flowable masses selected from the range of volumes comprising 2.5 ml, 5 ml, 10 ml, 20 ml, 50 ml and 100 ml, 200 ml, 400 ml, 500 ml, 1500 ml and 2500 ml with the volume being a combined volume for both chambers of the cartridge. Thus, in a preferred embodiment the dispensing system has a volume in the range of 1 to 2500 ml, more preferably of 1 to 500 ml.

In a further aspect of the present invention this relates to a method of venting a cartridge in accordance with the teaching presented herein, the method comprising the steps of:
 placing the piston into the cartridge;
 actuating the valve member; and
 effecting a venting of air present in the chamber in a vicinity of the first side of the piston cover between the piston cover and the piston body via the valve member.

Venting a cartridge using the aforementioned method one can ensure that air present in the chamber of a cartridge between the component present in the chamber and the piston can be removed in order to ensure a longer storage life time of the component present in that chamber.

It is further preferred when the venting of air present in the chamber in the vicinity of the medium side, in particular air present in the region of the concavely shaped central region, is also effected via the further venting means or device (vent).

In another embodiment, a piston cover has a radially extending attachment portion, a rear side and a front side and a piston body including a front side and a rear side. The rear side of the piston cover is arranged adjacent to at least a part of the front side of the piston body and comprises a valve member configured and arranged to be received within the piston body and to extend into the piston body towards the rear side of the piston body. The piston cover is configured to move relative to the piston body upon actuation of the valve member, and the piston cover being non-releasably connected to the piston body by a part of the piston body being overmolded to the radially extending portion of the attachment portion of the piston cover.

This embodiment ensures that attachment portion of the piston cover does not move longitudinally relative to the piston body. Moreover, this embodiment results in a beneficial design of the piston that ensures a secure attachment between the piston body and the piston cover. In this embodiment, the attachment portion is an undercut which can be difficult to remove during the molding process. As can be understood, undercuts on molded parts are features that prevent the part from being directly ejected from an injection molding machine. Therefore, one embodiment of the present invention is a method of molding a piston. In this embodiment, a two-component piston is formed by injecting a material into a mold having a first mold and a second mold to form a piston cover, the second mold being rotatable along a longitudinal axis relative to the first mold, rotating the second mold relative to the first mold to expose an opening in a surface of the second mold, removing the piston cover by passing an undercut portion of the piston cover through the opening, and attaching the piston cover to a piston body.

It is preferred in this embodiment that the attachment portion and the piston cover are integrally formed, preferably in an injection molding process. Integrally forming the attachment portion and the piston cover ensures that a sufficient connection is present between these parts to enable the function of these parts in use during storage of components in a cartridge and the venting of a cartridge during the filling procedure.

BRIEF DESCRIPTION OF THE DRAWINGS

The invention will be explained in more detail hereinafter with reference to the drawings.

DETAILED DESCRIPTION OF THE EMBODIMENTS

Figure 1:
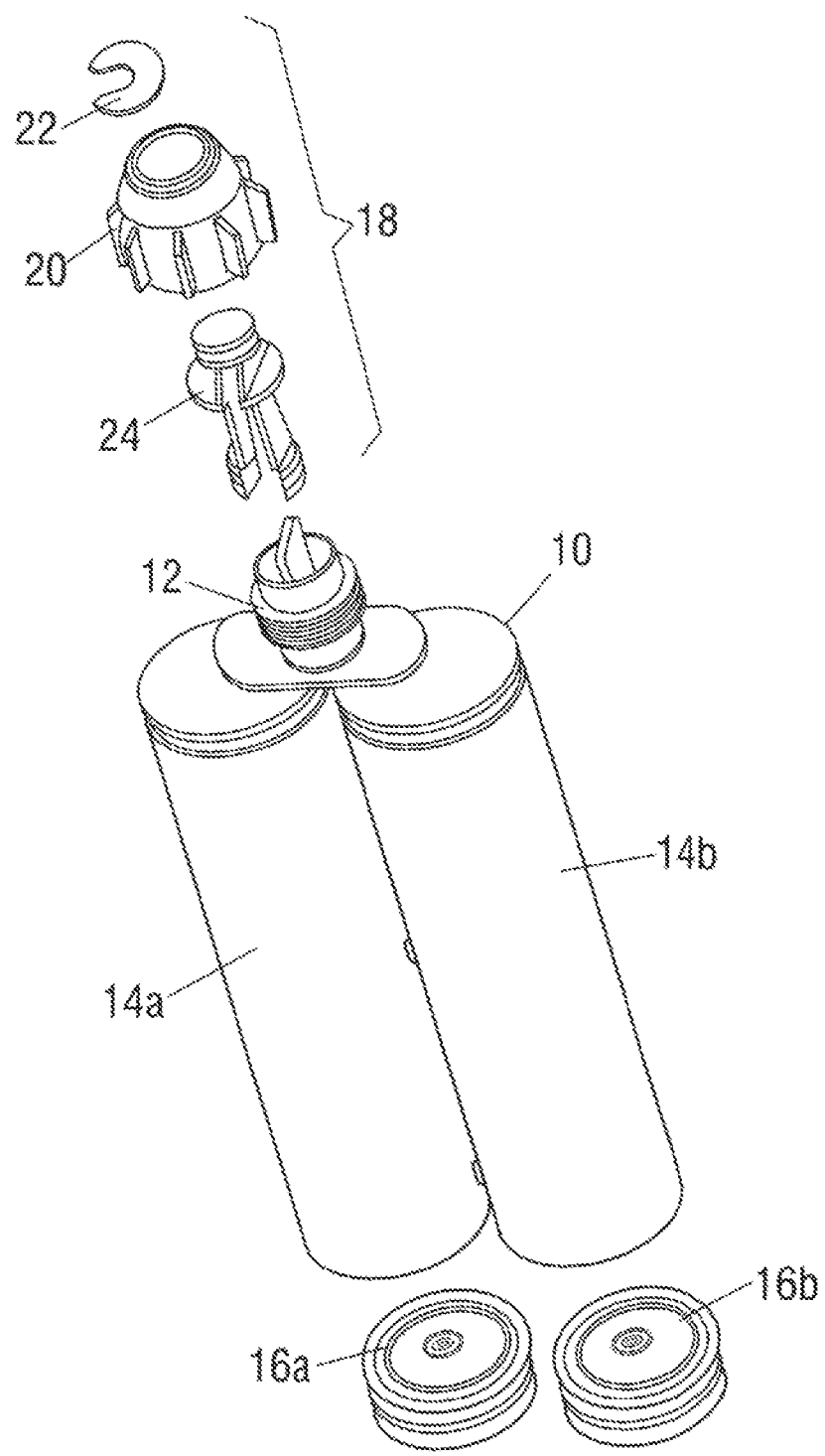
FIG. 1 is an exploded view of components of an embodiment of a cartridge.

Features which have the same or a similar function will be described in the following using the same reference numeral. It is also understood that the description given with respect to reference numerals used in one embodiment also applies to the same reference numerals in connection with other embodiments unless something is stated to the contrary.

FIG. 1 shows a first embodiment of a cartridge 10. The cartridge 10 comprises an outlet 12, two chambers 14a, 14b and two pistons 16a, 16b. The outlet 12 of the cartridge 10 is sealed through the use of a cap mechanism 18. The cap mechanism 18 comprises a cap 20 which is secured to the cartridge 10 by a circlip 22 engaging a sealing plug 24. The outlets 12 are sealed through the use of the sealing plug 24. The cartridge 10 shown in FIG. 1 is a so-called 1:1 cartridge 10.

Figure 2:
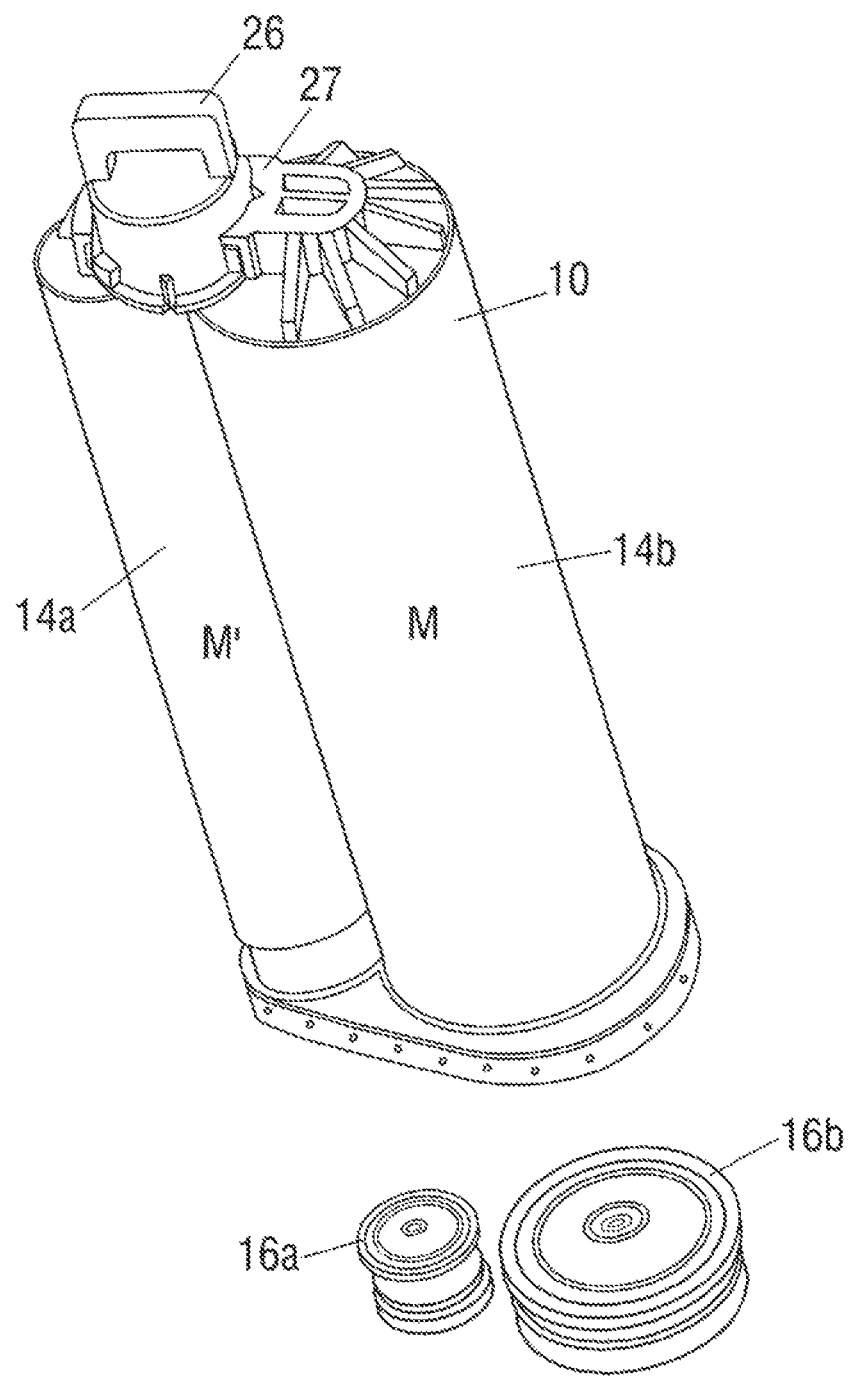
FIG. 2 is a further exploded view of components of a further embodiment of a cartridge.

FIG. 2 shows a further embodiment of a cartridge 10. In contrast to the embodiment of FIG. 1 the cartridge 10 of FIG. 2 shows a so-called 4:1 cartridge 10. This means that a volume of material M that can be stored in the first chamber 14b is four times a volume of material M' that can be stored in the second chamber 14a. A further difference between the cartridges 10 of FIG. 1 and FIG. 2 is the closure cap 26. The closure cap 26 of FIG. 2 is secured at the cartridge 10 by a so-called bayonet means or device 27 as is well known in the art. Other kinds of closure caps (not shown) can also be used to seal off the outlet 12 from the cartridge 10.

The closure cap 26, the cap mechanism 18 and the ratios of cartridges 10 shown in FIG. 1 and FIG. 2 can be arbitrarily combined, depending on the specific use of the cartridge 10 and/or of the materials to be dispensed using said cartridge 10. Since the volume of the chambers 14a, 14b of the cartridge of FIG. 2 is different, the outer diameter, i.e. the size of the pistons 16a, 16b employed in the chambers 14a, 14b is also different as is clear from FIG. 2.

Figure 3:
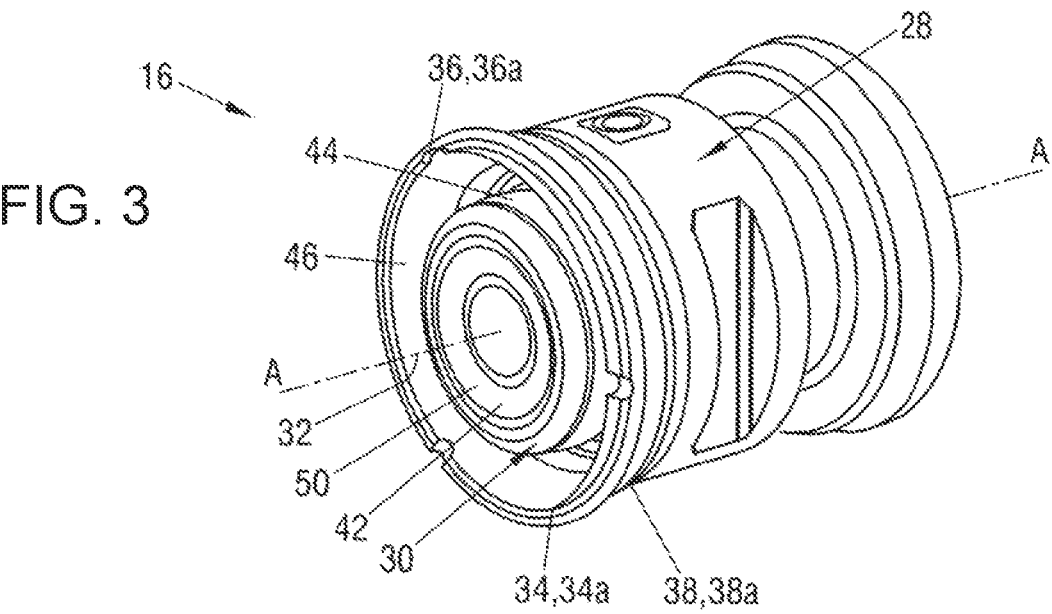
FIG. 3 is a view of an embodiment of a piston.

FIG. 3 shows a schematic view of a piston 16. The piston 16 comprises a generally cylindrically shaped piston body 28 and a piston cover 30. The piston cover 30 covers at least a substantial part of a first side 32 of the piston 16. The piston body 28 further comprises a centering portion 34 in the form of a circumferentially extending chamfered lip 34a at the first side 32. The lip 34a has three venting slots 36 disposed therein as venting means or system 36a in order to permit a venting of air present between the lip 34a and a chamber wall of the cartridge (not shown) once the piston 16 is installed in the cartridge 10 and a venting process is carried out.

A sealing lip 38 is disposed beneath the chamfered lip 34a as a sealing means or device 38a. The selling lip 38 is provided to ensure a seal between the cartridge 10 and the piston 16 in order to prevent air or the like from entering or exiting the cartridge 10 via the sealing lip 38. As can be seen the sealing lip 38 is adjacent to the centering portion 34.

Moreover, a boundary of the venting slots 36 is preferably directly adjacent to a boundary of the sealing lip 38 which is adjacent to the centering portion 34. This ensures that the venting means 36a are positioned such that air can be reliably vented from the space between the centering lip 34 and the cartridge wall. In the Figure shown, the venting slots 36 have the form of a generally U-shaped valley in a cross-section thereof. Naturally speaking any other kind of shape can be selected for the venting slots 36, such as a V-shaped valley or a simple through bore extending through the centering portion.

On insertion of the piston 16 into the cartridge 10 the centering portion 34 not only functions as a centering aid to protect the sealing lip 38 from becoming damaged on insertion of the piston 16 into the cartridge and thus aids in avoiding leaks, but also as a scraper and thereby helps to clear material and any particles present at the cartridge wall from the area close to the cartridge wall (this is naturally only the case when the materials include particles).

In this connection it should be noted that the piston cover 30 is typically made from a material different from that of the piston body 28. The material of the piston cover 30 can e.g. comprise PE or PBT; that of the piston body 28 can e.g. comprise PA (polyamide) or HDPE. In a preferred embodiment of the two-component piston 16, the piston cover 30 comprises PBT and the piston body 28 comprises HDPE.

The piston cover 30 has a concavely shaped central region 42 which can be considered to have the shape of a plate. The central region 42 of the piston cover comprises a crown 74.

Venting grooves (not shown) can be disposed at a front side 50 of the piston cover 30 to facilitate the air removal from the concavely shaped central region 42. Such venting grooves could extend from the central region 42 of the piston cover 30, and also project downwardly along a peripherally extending side portion 44 of the piston cover 30 into a groove 46 formed within the piston body 28. The venting grooves could extend into the groove 46 over a complete height of the side portion 44.

Figure 4:
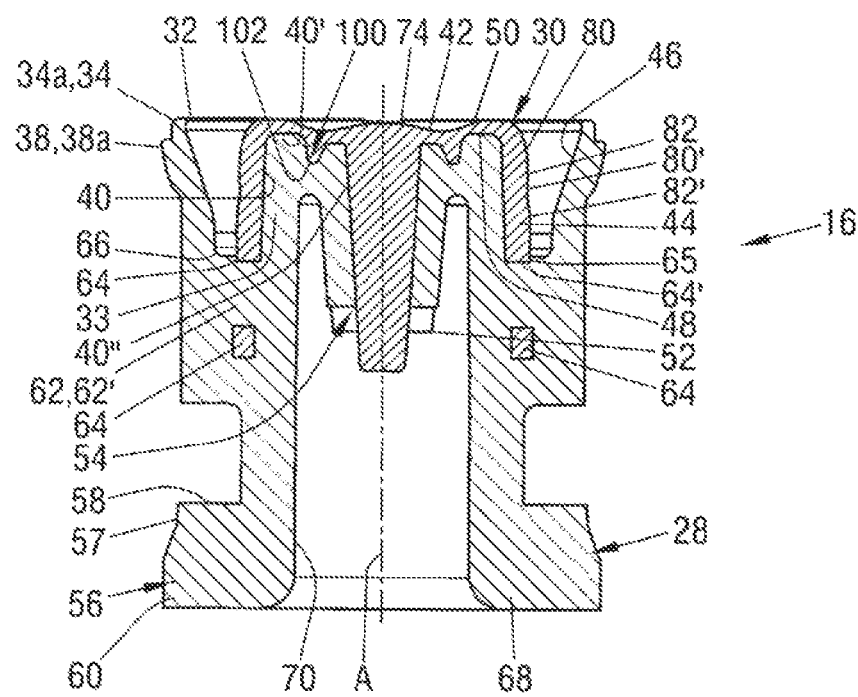
FIG. 4 is a section through the piston of FIG. 3.

FIG. 4 shows a section through the piston 16 of FIG. 3 along the sectional line A-A of FIG. 3 that coincides with a longitudinal axis A of the piston 16. The piston cover 30 extends into the peripherally extending groove 46 of the piston body 28. Moreover, the piston cover 30 has the front side 50 at the first side 32 and a rear side 48. The rear side 48 has a shape which is complementary to a substantial part of the shape of the first side 32 of the piston body 28. The piston cover 30 also has a so-called valve pin 52 which forms part of a valve 54 arranged between the piston cover 30 and the piston body 28. The center of the valve pin 52 coincides with the longitudinal axis A of the piston 16. At the first side 32, the piston body 28 comprises an inner wall 33 having a top end 40', an outer surface 40 and a valve surface 40". Parts of the rear side 48 the piston cover 30 are supported at the inner wall 33 in a non-venting state of the piston 16.

On installation of the piston 16 into the cartridge 10, the valve pin 52 can be actuated. Thereby the piston cover 30 is lifted off from the piston body 28 and permits an air flow in a venting channel (not shown) then present between the rear side 50 of the piston cover 30 and the wall 33 of the piston body 28, i.e. between the piston cover and the top end 40', the outer surface 40 and the valve surface 40". This then permits a venting of residual are present at the first side 32 of the piston 16 from the front side 50 of the piston cover via the valve 54.

On actuating the valve pin 52 from the second side 68, the valve pin 52 is moved along the longitudinal axis A in the direction of the piston cover 30 causing the concavely shaped central region 42 to deflect and to become less concave or in some instances even convex. Thereby forming the venting channel (not shown) between the rear side 50 of the piston cover 30 and the piston body 28 in the region of the top end 40', the outer surface 40 as well as the valve surface 40".

The longer a length of the valve pin 52 selected, the further the piston cover 30 can be lifted from the piston body 28. Thereby, a space of the venting channel provided for air to be vented from the cartridge 10 via the piston 16 is enlarged. Rather than using the valve pin 52 shown in the Figures other forms of valve members 52', such as a hollow cylindrical member (not shown) can be used. The valve member 52' has two functions, namely to cooperate with a plunger for venting and with the valve surface 40" of the piston body to form the valve 54.

The piston 16 has an outer peripheral surface 56 formed by a peripherally extending outer wall 57, with the annular groove 46 being formed between the outer wall 57 and the inner wall 33.

The outer peripheral surface 56 respectively the outer wall 57 of FIG. 4 has a substantially cylindrical outer shape and has the chamfered centering lip 34 at the first side 32. Following an outer contour of the outer peripheral surface 56 from the first side 32 to a second side 68 of the piston 16, the piston body 28 comprises the centering lip 34, the sealing lip 38, a first recess 58 and a stabilizing projection 60 formed at the second side 68. The first recess 58 is arranged between the sealing lip 38 and the stabilizing projection 60.

The stabilizing projection 60 is disposed at the piston 16 in order to stabilize the piston 16 as it travels along the cartridge wall during a dispensing action. This ensures that the piston 16 travels along the cartridge wall in an as uniform as possible manner.

The second side 68 of the piston 16 further comprises a central recess 70 into which a plunger (not shown) can be introduced in order to actuate the valve pin 52. The second side 68 can further be actuated to move the piston 16 in the cartridge to dispense a material M, M' present in the cartridge 10 via the outlet 12.

The plunger is designed such that it does not engage the valve 54 during a dispensing action, as otherwise a component present in the cartridge 10 could leak out of the cartridge 10 via the central recess 70 on dispensing.

The piston body 28 can comprise an O-ring (not shown) arranged at the outer peripheral surface 56. Such sealing O-rings are advantageously used, in order to ensure a continuous seal of cartridges that are not only used for one application, but for many applications spaced apart in time.

The piston cover 30 is non-releasably connected to the piston body 28. The non-releasable connection is formed by a part 62 of the piston body 28 extending through an attachment portion 64 of the piston cover 30. The piston cover 30 comprises at least two attachment portions 64 for the non-releasable connection between the piston cover 30 and the piston body 28. The piston body 28 comprises two parts 62 that each respectively extend through a respective attachment portion 64. The attachment portions 64 are arranged such that they face one another on opposite sides of the longitudinal axis A. The attachment portion 64 projects from the piston cover 30 at least generally in the direction of the second side 68.

Each attachment portion 64 comprises an aperture 64' (see also FIGS. 5A to 5C) and the part 62 of the piston body 28 that extends through the attachment portion 64 at least substantially completely fills an internal space of the aperture 64'.

In the present example the part 62 of the piston body 28 that extends through the attachment portion 64 is formed by a web 62' of material that extends through the attachment portion 64. The web of material is non-releasably connected to two sections of the piston body 28 disposed on either side of the attachment portion 64. The web 62' is formed from the same material as the piston body. Similarly the attachment portion 64 is formed from the same material as the piston cover 30.

The attachment portion 64 is integrally formed with the piston cover and projects from the piston cover 30 at a region of a base 66 of the groove 46 of the piston body 28 in the direction of the second side 68. The attachment portion 64 is completely received in the piston body. To this end the base 66 of the groove 46 comprises an attachment portion recess 65. The piston body 28 is formed around the attachment portion 64 and adjacent to the piston cover 30.

FIG. 4 further shows an annular projection 100 arranged at the rear side 48 of the piston cover 30. The annular projection 100 projects into a recess 102 that is arranged in the top end 40' of the piston body 28. The annular projection 100 cooperates with the recess 102 as a type of alignment member on activation of the valve member 52'. The alignment member namely ensures that on releasing a pressure at the valve member 52', i.e. when the piston cover 30 is moved back towards the piston body 28 along the longitudinal axis A, the piston cover 30 aligns correctly with the piston body 28 so that no gap is present between the top end 40' and the rear side 48. The presence of such a gap could allow air to come into contact with the material M, M' stored within the cartridge 10 such that the material M, M' could degrade faster over time in comparison to no air being present.

Figure 5A:
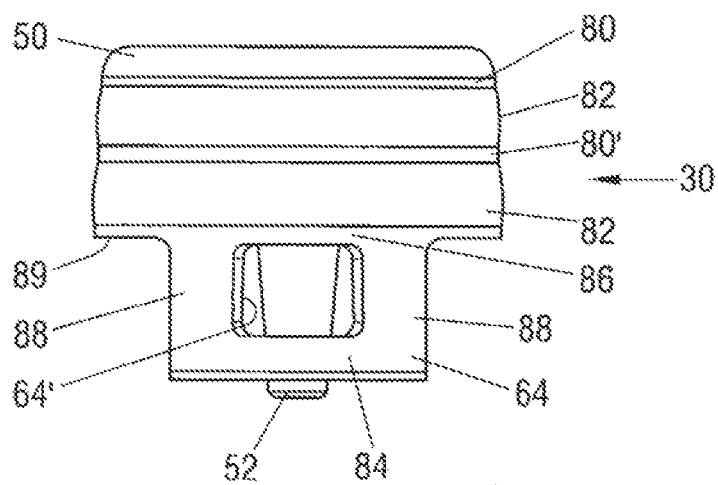
FIG. 5A is a first side view of a piston cover.
Figure 5B:
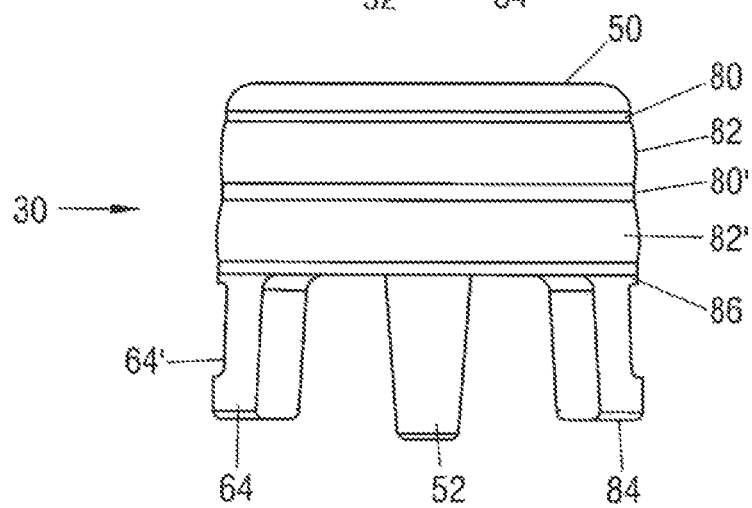
FIG. 5B is a second side view of the piston cover of FIG. 5A.
Figure 5C:
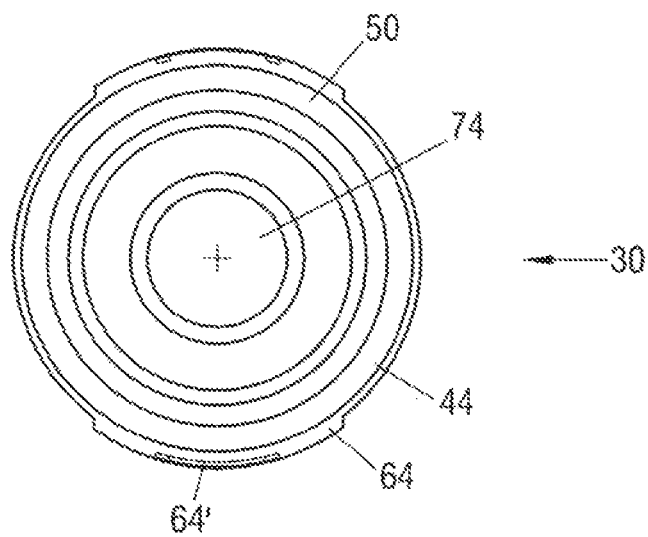
FIG. 5C is a view from above of the piston cover of FIG. 5A.

FIGS. 5A to 5C show various views of the piston cover 30. As can be seen the aperture 64' has an at least generally rectangular shape. The dimensions of the aperture 64' are chosen such that the lower frame 84 of the aperture 64' (i.e. the part which is completely embedded in the second plastic) is located roughly at equal distances to the surrounding exterior surfaces of the piston body 28, i.e. the outer wall 57 and a wall of the recess 70. The lower frame 84 is connected to the upper frame 86 of the attachment portion 64 via two arms 88. In the drawing shown a width of the arms 88 is greater than a height of the lower frame 84. The height of the lower frame could also be more than a width of the arms 88 or equivalent thereto. The upper frame 86 is integrally formed at a lower side 89 of the piston cover 30 and thus projects from the piston cover 30 at the lower side 89 thereof.

The side portion 44 of the piston cover has an undulated shape indicated by two recesses 80, 80' and two peaks 82, 82'. These features are present in order to ensure a gripping of the piston cover 30 during a forming of the piston body 28 as will be discussed in the following.

Figure 6A:
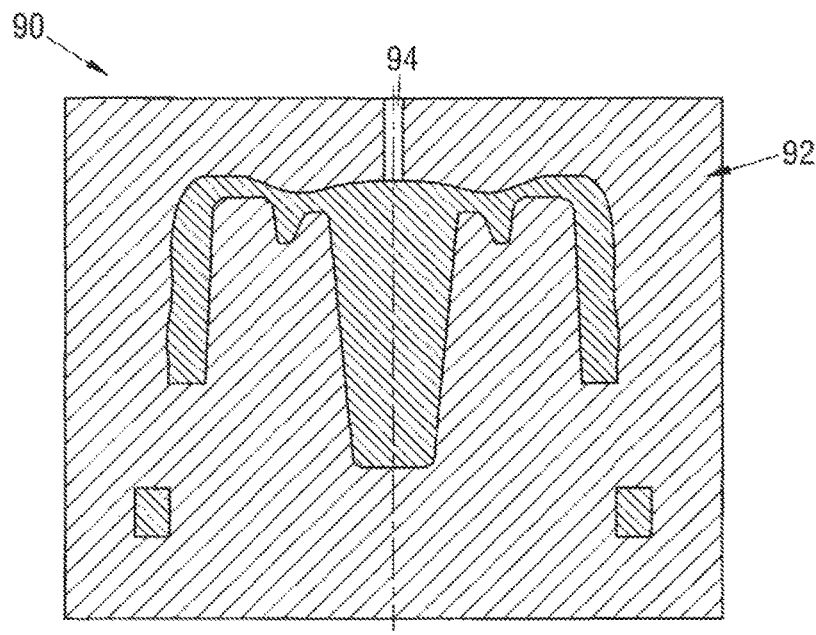
FIG. 6A is a schematic section through a first mold of an injection molding tool.

FIG. 6A shows a schematic section of an injection mold 90 for the two-component piston 16 discussed in the foregoing. The injection mold 90 comprises a first mold 92 for the piston cover 30. The first mold has a first injection channel 94 forming a first point of injection for the injection molding material for the piston cover 30. The first injection channel 94 is present at a part of the first mold 92 for molding the front side 50 of the piston cover 30.

The injection molding material is introduced into the first mold 92 at the respective temperatures and pressures typically used for the material of the piston cover 30 via the first injection channel 94.

Figure 6B:
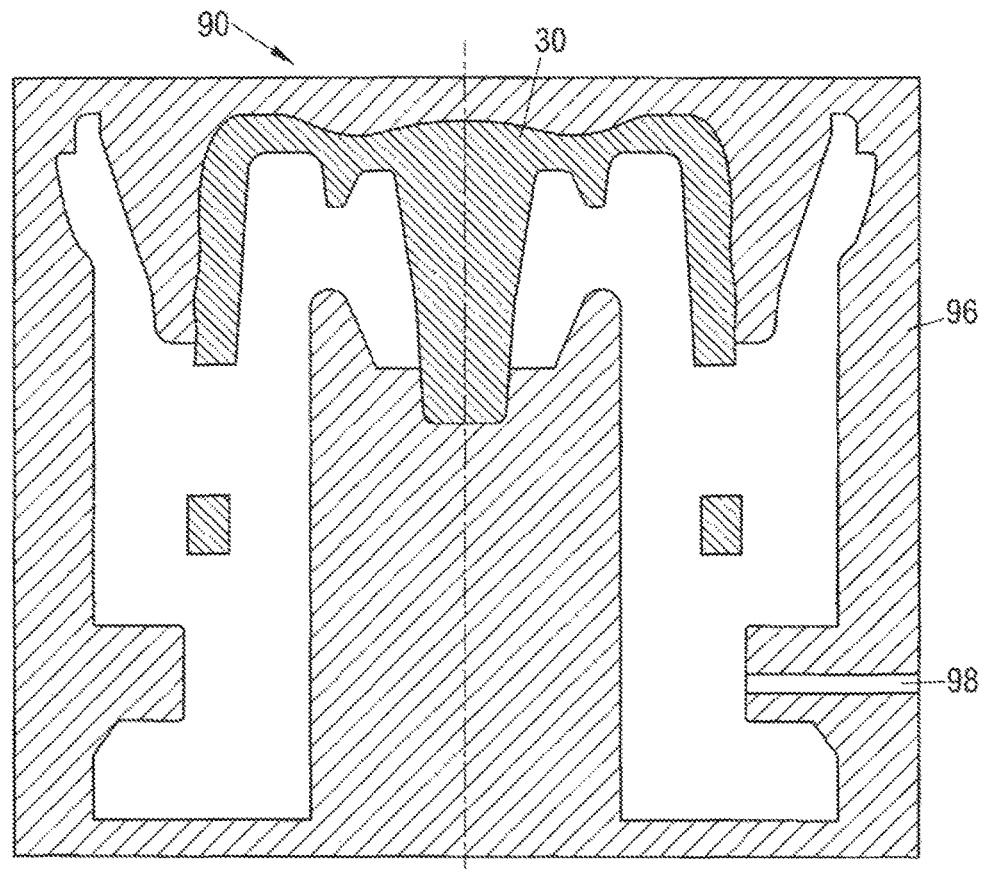
FIG. 6B is a schematic section through a second mold of the injection molding tool.

As shown in FIG. 6B, the injection mold 90 further comprises a second mold 96 for the piston body 28. On injection molding the piston 16, the piston cover is initially molded in the first mold 92 and subsequently forms a part of the second mold 96.

The second mold 96 comprises a second injection channel 98 forming a second point of injection used for the injection of molding material for the piston body 28. The second point of injection is present in a region of a part of the second mold 96 for an outer peripheral wall 57 of the piston body 28.

Figure 7A:
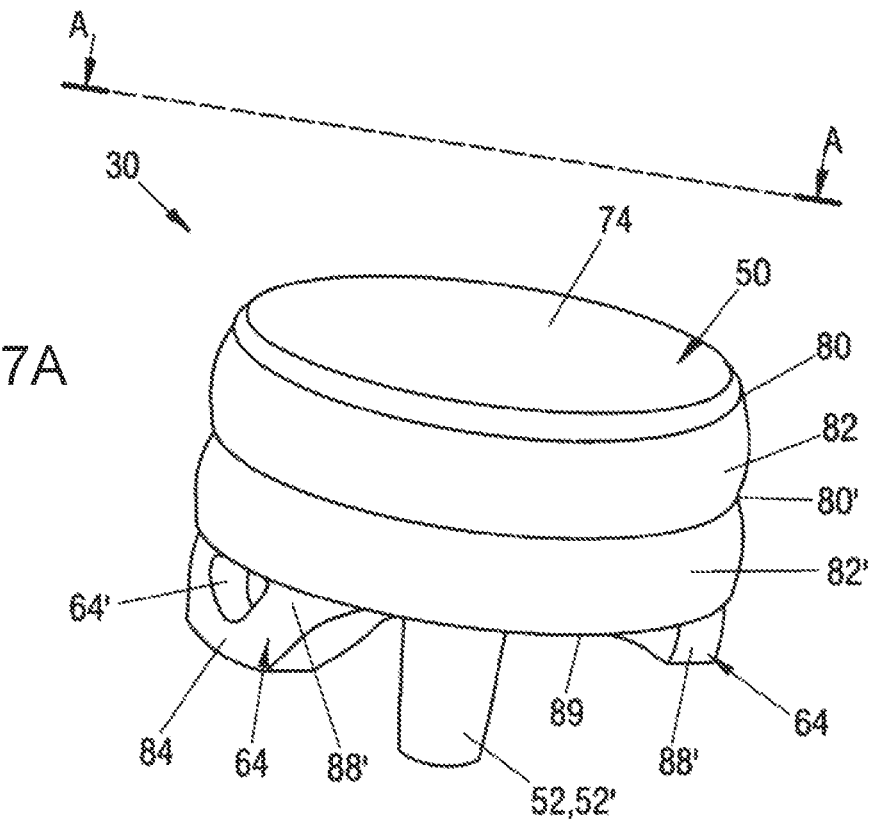
FIG. 7A is a schematic view of a further type of piston cover.

FIG. 7A shows a schematic view of a further type of piston cover 30. The attachment portion 64 of the piston cover 30 has a different design to that of the piston cover shown e.g. in FIG. 5A.

Firstly, a height of the attachment portion 64 of the piston cover 30 of FIG. 7A is less than that of the attachment portion 64 of FIG. 5. In particular the height of the attachment portion 64 of the piston cover 30 of FIG. 7A can be selected between 40 to 60% of the height of the piston cover 30 of FIG. 5A.

Secondly, arms 88' of the attachment portion 64 of FIG. 7A do not extend in parallel to or at least substantially in parallel to the longitudinal axis A like the arms 88 of FIG. 5A. The arms 88 of FIG. 5A have essentially the same width between the lower frame 84 and the upper frame 86, in contrast to which the arms 88' of FIG. 7A are arranged such there width increases in size between the lower frame 84 and the lower side 89.

Thirdly, the aperture 64' does not have an at least substantially rectangular or rectangular shape, but rather has the shape of a semi-circle or of a half moon.

Figure 7B:
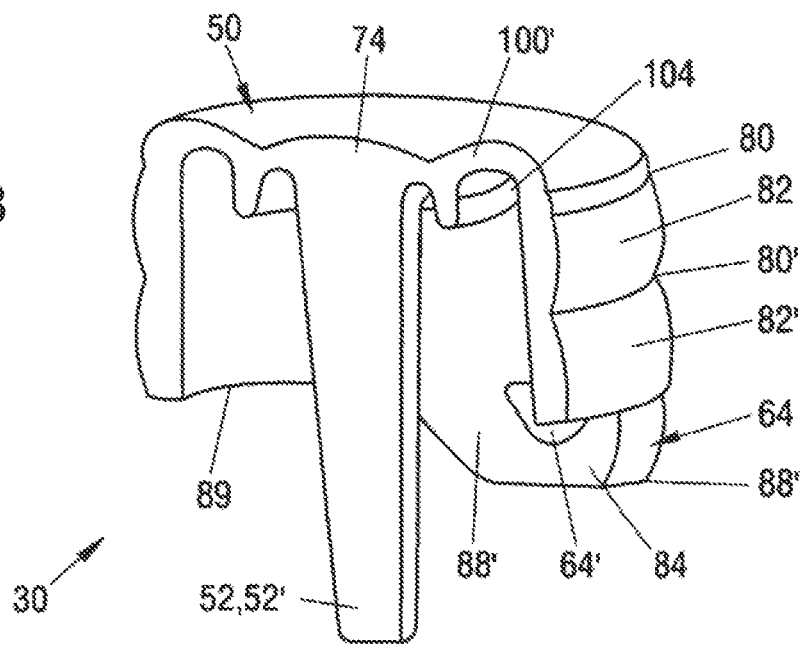
FIG. 7B is a section through the piston cover of FIG. 7A along the sectional line A-A.

In this connection it should be noted that the aperture 64' can be formed of a shape differing from the rectangular shape shown in FIGS. 5A to 5C or the half-moon shape shown in FIGS. 7A and 7B. By way of example triangular shapes, polygonal shapes, circular shapes, elliptical shapes, part polygonal shapes, part circular shapes and part elliptical shapes can also be envisaged. The purpose of the aperture 64' is namely to form the non-releasable connection between the piston cover 30 and the piston body 28 and hence any shape that makes available the non-releasable connection and that fulfills the function of the non-releasable connection can be selected for the shape of the aperture 64'.

The different shape and size of the piston cover 30 of FIG. 7A in comparison to the piston cover 30 shown in FIG. 5A makes available a more aesthetically pleasing piston cover 30, in particular if this is used e.g. with a see through piston cover.

In this connection it should be noted that a height of the attachment portion 64 of all designs discussed herein can be selected in the range of 10 to 50%, in particular 20 to 40%, of the height of the valve pin 52 measured between the crown 74 and the end of the valve pin 52 disposed opposite the crown 74.

It should further be noted that a height of the piston cover 30 between the lower side 89 and the crown 74 of all designs discussed herein can be selected in the range of 40 to 70%, in particular 50 to 60%, of the height of the valve pin 52 measured between the crown 74 and the end of the valve pin 52 disposed opposite the crown 74.

It should further be noted that a thickness of the piston cover 30 of all designs discussed herein can be selected in the range of 1 to 15%, in particular 5 to 10%, of the height of the valve pin 52 measured between the crown 74 and the end of the valve pin 52 disposed opposite the crown 74. In this connection the thickness is measured at portions of the piston cover 30 where the annular projection 100, 100' is not present.

FIG. 7B shows a section through the piston cover 30 of FIG. 7A along the sectional line A-A. The annular projection 100' shown in FIG. 7A comprises a convex outer surface 104 that projects radially outwardly from the longitudinal axis A. The reason for providing an outer surface 100' that bulges radially outwardly rather than a straight surface as is depicted e.g. in FIG. 5A is to ensure an improved seal between the piston cover 30 and the piston body 28 during a venting process when the valve member 52' is activated.

Figure 8:
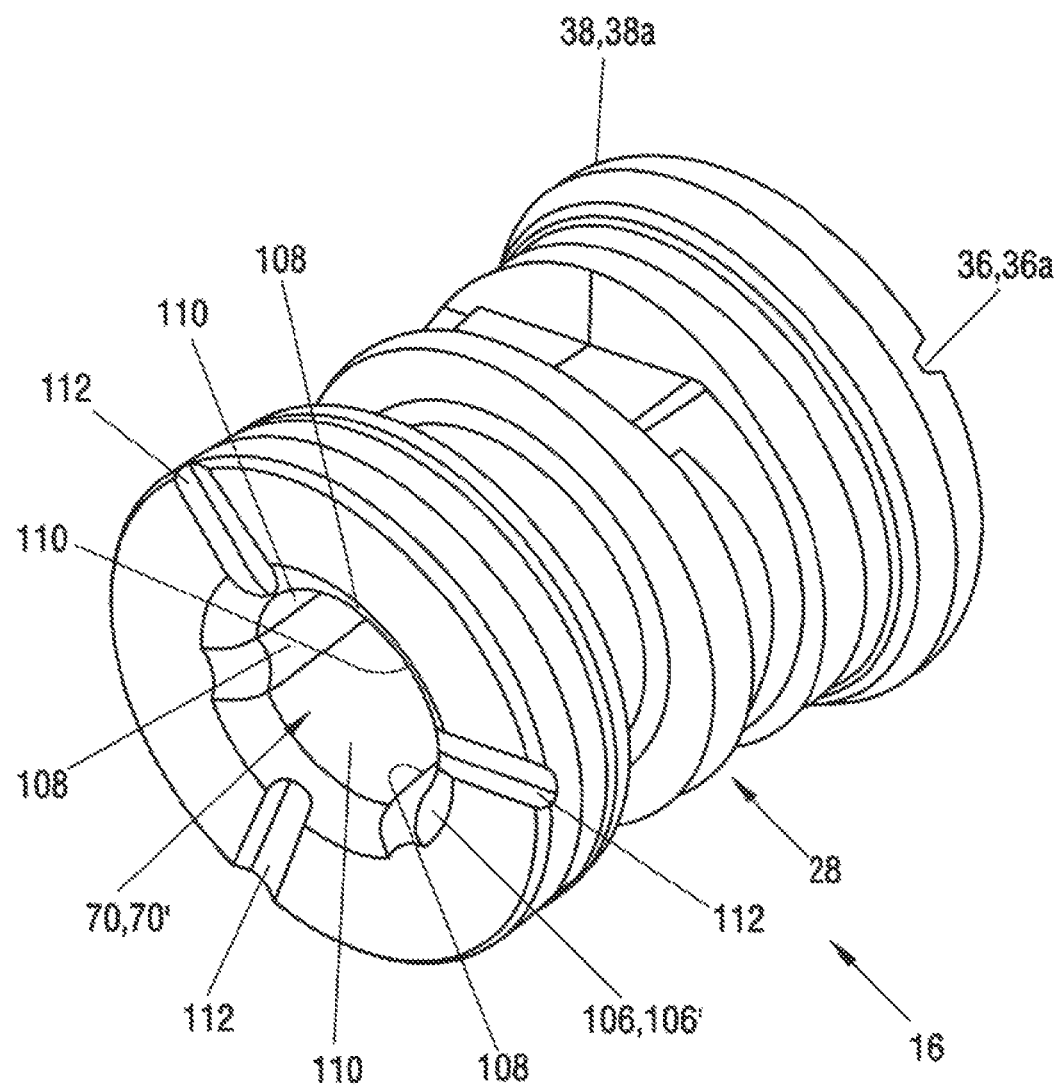
FIG. 8 is a perspective view of a bottom end of the piston.

FIG. 8 shows a perspective view of a bottom end 106 of the piston body 28 of the piston 16. The central recess 70 of the piston body 28 is configured to receive the valve pin piston 52 of the valve member 52' as shown in FIG. 4. In some designs, like the one shown in FIG. 8, the valve pin 52 is configured to slide relative to domes 108 that project from an inner wall 70' of the central recess 70 of the piston body 28.

A space present between the domes 108, the valve pin 52 and the inner wall 70' of the central recess then forms venting passages 110 via which air can be removed from the non-shown venting channel present between the rear side 50 of the piston cover 30 and the wall 33 of the piston body 28 when the piston cover 30 is lifted off from the piston body 28 on actuation of the valve pin 52.

This air can further be removed via venting grooves 112 present at a bottom end surface 106' of the bottom end 106. In the example of FIG. 3 a venting groove 112 is provided for each of the three venting passages 110 and domes 108 provided. In this connection it should be noted that the number of domes 108, the number of venting passages 110 and the number of venting grooves 112 can respectively be selected between 2 and 8. It is advantageous, nut not required, for the purpose of venting if the domes 108, the venting passages 110 and the venting grooves 112 are symmetrically arranged relative to the valve pin 52.

Figure 9A:
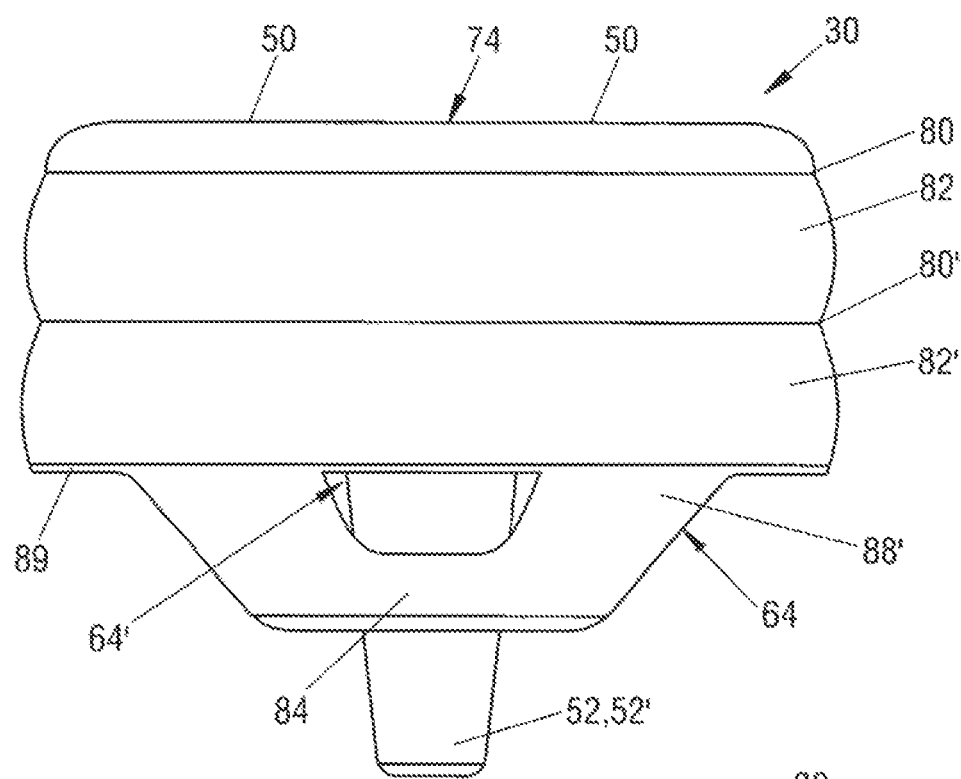
FIGS. 9A and 9B are schematic views of a further type of piston cover.
Figure 9B:
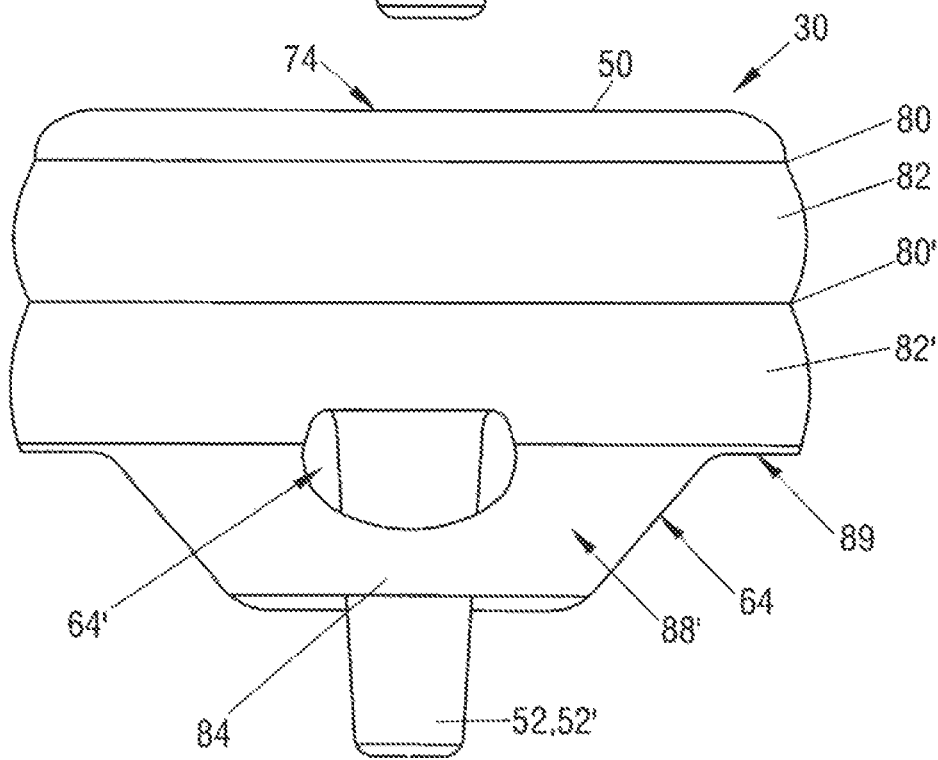
Figure 10:
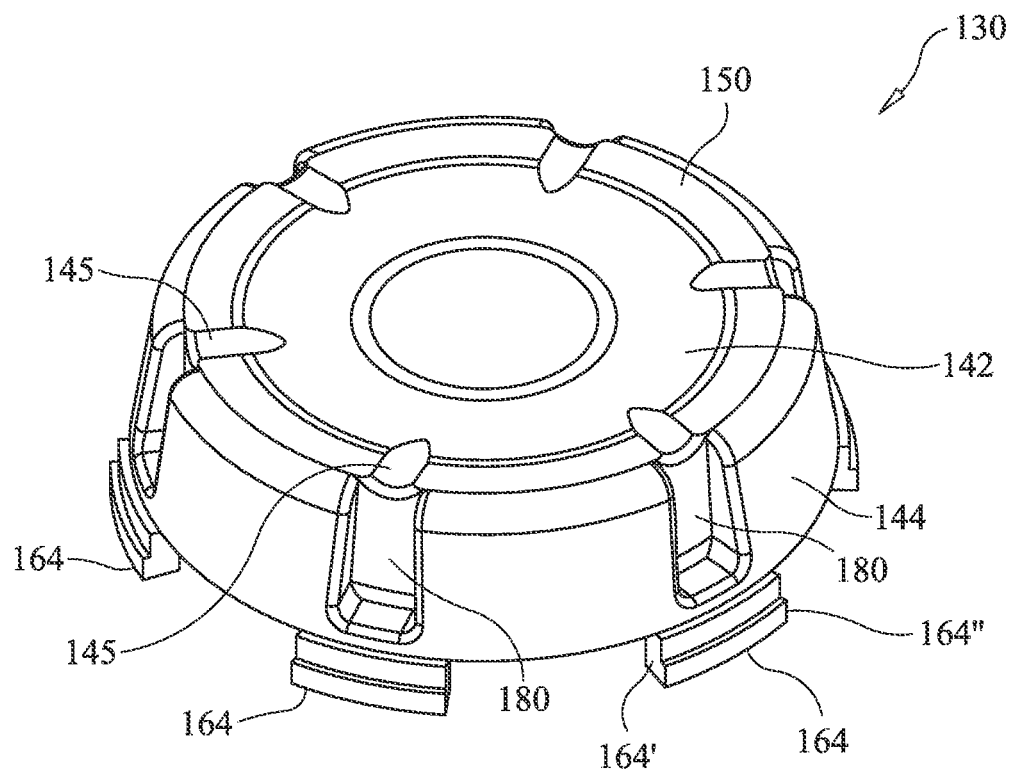
FIG. 10 is a top perspective view of another embodiment of a piston cover.
Figure 11:
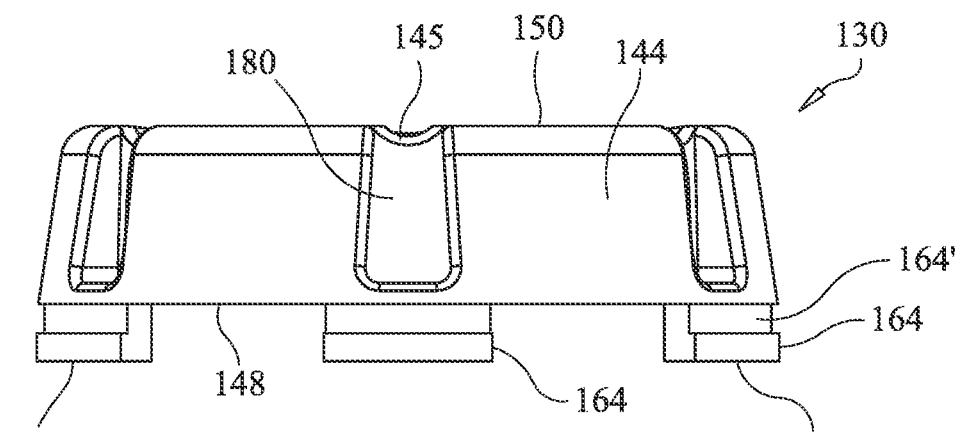
FIG. 11 is a side elevational view of the piston cover of FIG. 10.
Figure 12:
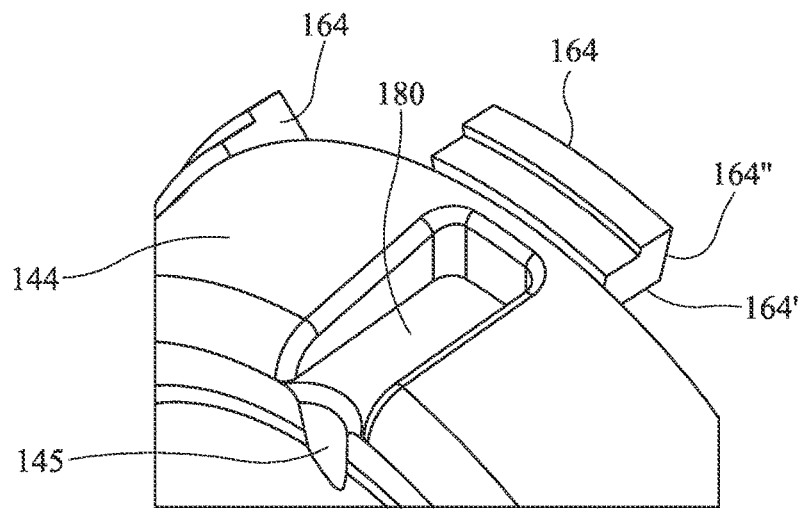
FIG. 12 is enlarged perspective view of the piston cover of FIG. 10.

FIGS. 9A and 9B show views of a further type of piston cover 30 (lower drawing) in comparison to the piston cover 30 (upper drawing) shown in FIG. 7A. The attachment portion 64 of the lower piston cover 30 of FIGS. 9A and 9B is designed slightly different to that shown in FIG. 7A.

The aperture 64' is no longer of half-moon shape, but rather is a composite shape formed by a combination of a rectangle and a half-moon shape attached to the rectangle. The aperture 64' also has a greater opening size. This change in size and shape of the attachment portion 64 and aperture 64' facilitates improved attachment of the piston cover 30 to the piston body 28 while forming the piston body 28 at the piston cover 30.

Moreover, the arms 88' of the upper piston cover of FIGS. 9A and 9B have a slightly different angle of inclination with respect to the lower side 89 in comparison to the angle of inclination shown in connection with FIG. 7A. This enables the arms 88' to be formed with more material which also facilitates improved attachment of the piston cover 30 to the piston body 28.

Also, a spacing between the aperture 64' and the lowest point of the attachment portion 64 can be increased in order to provide more material at the attachment portion 64. The more material is present at the attachment portion, on the one hand, improves the attachment between the piston cover 30 and the piston body 28 and, on the other hand, also facilitates an improved seal between the piston cover 30 and the piston body 28 in the region of the attachment portion recess 65.

FIGS. 10-21 illustrate another embodiment of a piston 116 of the present invention and a method of forming piston 116. Similar to the embodiments described above the piston 116 is operable with cartridge 10 and would operate in the manner described herein. In particular, the piston is cable of operating in the cartridge disclosed in the embodiment of FIG. 1 and/or the cartridge disclosed in the embodiment of FIG. 2 and/or any other suitable cartridge.

It has been found that some piston covers can move longitudinally relative to the piston body at positions other than the venting areas. In some piston covers, due to the attachment between the piston cover and the piston body, the attachment portion of the piston cover can slide or move with respect to the piston body. Such movement is generally undesirable. The embodiment described herein overcomes this disadvantage.

Figure 13:
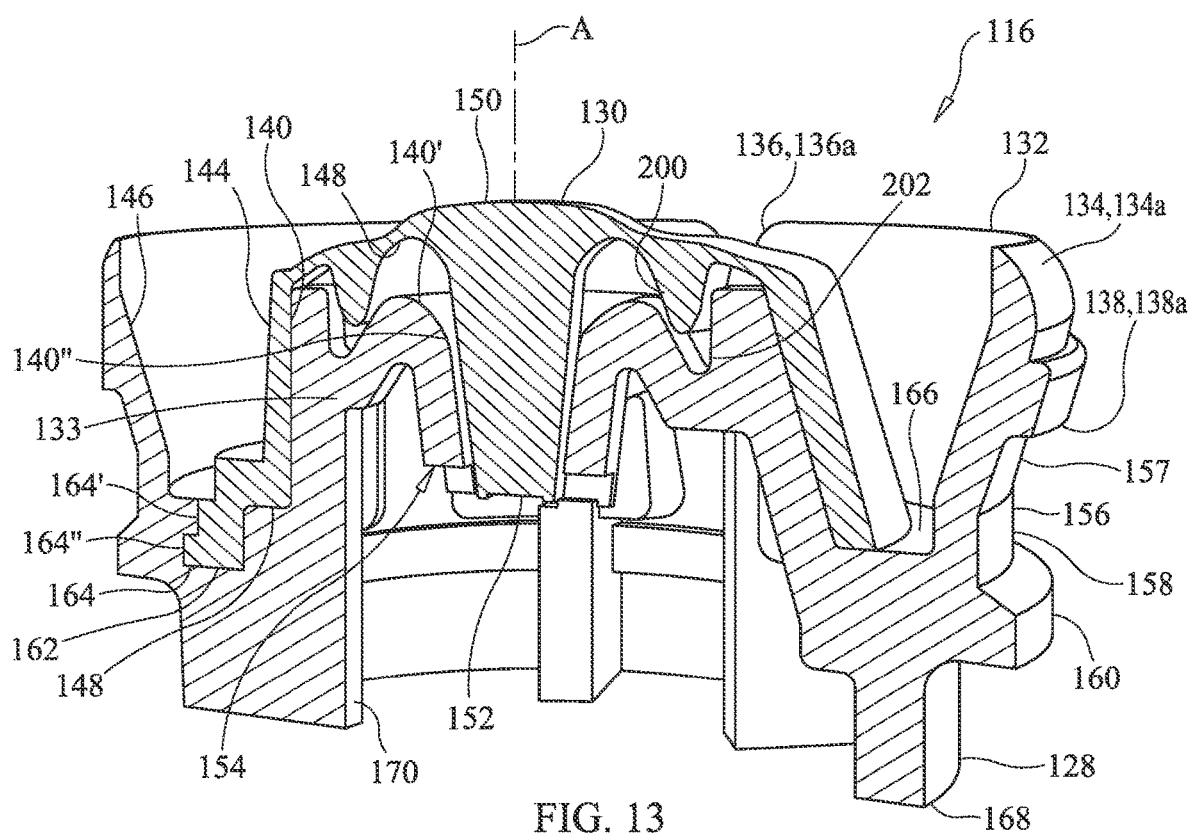
FIG. 13 is a cross sectional view of the piston cover of FIG. 10 connected to a piston body.

As shown in FIG. 13, the piston 116 comprises a generally cylindrically shaped piston body 128 and a piston cover 130. The piston cover 130 covers at least a substantial part of a first side 132 of the piston 116. The piston body 128 further comprises a centering portion 134 in the form of a circumferentially extending chamfered lip 134a at the first side 132. The lip 134a has three venting slots 136 disposed therein as venting means or system 136a in order to permit a venting of air present between the lip 134a and a chamber wall of the cartridge (not shown) once the piston 116 is installed in the cartridge 10 and a venting process is carried out.

A sealing lip 138 is disposed beneath the chamfered lip 134a as a sealing means or device 138a. The selling lip 138 ensures a seal between the cartridge 10 and the piston 116 in order to prevent air or the like from entering or exiting the cartridge 10 via the sealing lip 138. As can be seen the sealing lip 138 is adjacent to the centering portion 134.

Moreover, a boundary of the venting slots 136 is preferably directly adjacent to a boundary of the sealing lip 138 which is adjacent to the centering portion 134. This ensures that the venting system 136a is positioned such that air can be reliably vented from the space between the centering lip 134 and the cartridge wall. Similarly to the venting slots described herein, the venting slots 136 can have the form of a generally U-shaped valley in a cross-section thereof. Naturally speaking any other kind of shape can be selected for the venting slots 136, such as a V-shaped valley or a simple through bore extending through the centering portion.

Upon insertion of the piston 116 into the cartridge 10 the centering portion 134 not only functions as a centering aid to protect the sealing lip 138 from becoming damaged on insertion of the piston 116 into the cartridge and thus aids in avoiding leaks, but also as a scraper and thereby helps to clear material and any particles present at the cartridge wall from the area close to the cartridge wall (this is naturally only the case when the materials include particles).

In this connection it should be noted that the piston cover 130 is typically made from a material different from that of the piston body 128. The material of the piston cover 130 can e.g. comprise PE or PBT; that of the piston body 128 can e.g. comprise PA (polyamide) or HDPE. In a preferred embodiment of the two-component piston 116, the piston cover 130 comprises PBT and the piston body 128 comprises HDPE.

The piston cover 130 has a concavely shaped central region 142 which can be considered to have the shape of a plate.

Venting grooves 145 can be disposed at a front side 150 of the piston cover 130 to facilitate the air removal from the concavely shaped central region 142. The venting grooves 145 can extend from the central region 142 of the piston cover 130, and also project downwardly along a peripherally extending side portion 144 of the piston cover 130 into a groove 146 formed within the piston body 128. The venting grooves 145 can extend into the groove 146 of the piston body 128 over a complete height of the side portion 144.

FIG. 13 illustrates a section through the piston 116. The piston cover 130 extends into the peripherally extending groove 146 of the piston body 128. Moreover, the piston cover 130 has the front side 150 at the first side 132 and a rear side 148. The rear side 148 has a shape which is complementary to a substantial part of the shape of the first side 132 of the piston body 128. The piston cover 130 also has a so-called valve pin 152 which forms part of a valve 154 arranged between the piston cover 130 and the piston body 128. The center of the valve pin 152 coincides with the longitudinal axis A of the piston 116. At the first side 132, the piston body 128 comprises an inner wall 133 having a top end 140', an outer surface 140 and a valve surface 140". Parts of the rear side 148 the piston cover 130 are supported at the inner wall 133 in a non-venting state of the piston 116.

Upon installation of the piston 116 into the cartridge 10, the valve pin 152 can be actuated. Thereby the piston cover 130 is lifted off from the piston body 128 and permits an air flow in a venting channel then present between the rear side 150 of the piston cover 130 and the wall 133 of the piston body 128, i.e. between the piston cover and the top end 140', the outer surface 140 and the valve surface 140". This then permits a venting of residual air present at the first side 132 of the piston 116 from the front side 150 of the piston cover via the valve 154.

On actuation of the valve pin 152 from the second side 168, the valve pin 152 moves along the longitudinal axis A in the direction of the piston cover 130 causing the concavely shaped central region 142 to deflect and to become less concave or in some instances even convex. Thereby forming the venting channel between the rear side 150 of the piston cover 130 and the piston body 128 in the region of the top end 140', the outer surface 140 as well as the valve surface 140".

The longer the length of the valve pin 152, the further the piston cover 130 can be lifted from the piston body 128. Thereby, a space of the venting channel provided for air to be vented from the cartridge 10 via the piston 116 can be increased. Rather than using the valve pin 152 shown in the Figures other forms of valve members 152, such as a hollow cylindrical member (not shown) can be used. The valve member 152 has two functions, namely to cooperate with a plunger for venting and to cooperate with the valve surface 140" of the piston body to form the valve 154.

The piston 116 has an outer peripheral surface 156 formed by a peripherally extending outer wall 157, with the annular groove 146 being formed between the outer wall 157 and the inner wall 133.

The outer peripheral surface 156 respectively the outer wall 157 as shown in FIG. 13 has a substantially cylindrical outer shape and has the chamfered centering lip 134 at the first side 132. Following an outer contour of the outer peripheral surface 156 from the first side 132 to a second side 168 of the piston 116, the piston body 128 comprises the centering lip 134, the sealing lip 138, a first recess 158 and a stabilizing projection 160 formed at the second side 168. The first recess 158 is arranged between the sealing lip 138 and the stabilizing projection 160.

The stabilizing projection 160 is disposed at the piston 116 in order to stabilize the piston 116 as it travels along the cartridge wall during a dispensing action. This ensures that the piston 116 travels along the cartridge wall in an as uniform as possible manner.

The second side 168 of the piston 116 further comprises a central recess 170 into which a plunger (not shown) can be introduced in order to actuate the valve pin 152. The second side 168 can further be actuated to move the piston 116 in the cartridge to dispense a material M, M' present in the cartridge 10 via the outlet 12.

The plunger is designed such that it does not engage the valve 154 during a dispensing action, as otherwise a component present in the cartridge 10 could leak out of the cartridge 10 via the central recess 170 on dispensing.

The piston body 128 can comprise an O-ring (not shown) arranged at the outer peripheral surface 156. Such sealing O-rings are advantageously used, in order to ensure a continuous seal of cartridges that are not only used for one application, but for many applications spaced apart in time.

Figure 14:
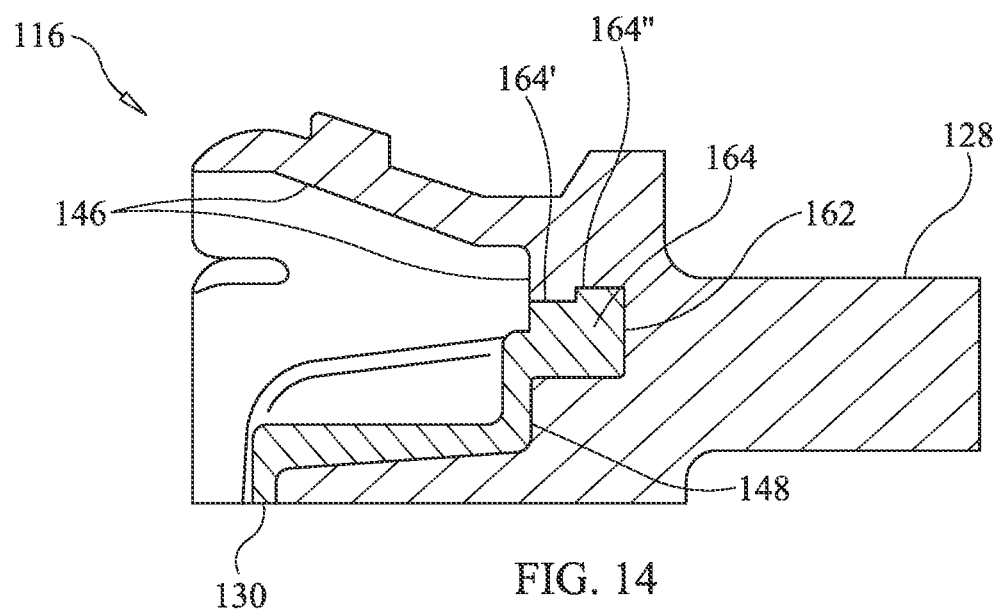
FIG. 14 is an enlarged partial cross sectional view of the connection between the piston cover and the piston body of FIG. 13.

As shown in FIGS. 13 and 14, the piston cover 130 is non-releasably connected to the piston body 128. The non-releasable connection is formed by an attachment part 164 of the piston cover 130 extending into a groove 162 of the piston body 128. The piston cover 30 comprises at least two attachment portions 164 for the non-releasable connection between the piston cover 130 and the piston body 128. The piston body 128 comprises at least two grooves 162 that each respectively receive an attachment part 164. Preferably, the piston cover 130 includes six (6) attachment parts 164 evenly spaced around the circumference of the cover 130. Accordingly, the piston body 128 preferably comprises six (6) corresponding grooves evenly spaced within the annular groove 146. It is noted however, that the piston cover 130 can include any suitable number of attachment parts, and the piston body 128 can include any number of corresponding grooves. Additionally, it is noted that a plurality or all of the attachment parts can be disposed in a continuous groove or partially continuous groove. For example, two (or more) adjacent attachment parts can be disposed in an extending single groove.

In one embodiment, the attachment parts 164 are arranged such that they face one another on opposite sides of the longitudinal axis A. The attachment part 164 projects from the piston cover 30 at least generally in the direction of the second side 168.

Each attachment part 164 comprises a first radial protrusion 164' and a second radial protrusion 164". The first radial protrusion 164' and the second radial protrusion 164" are generally aligned in the radial direction with the groove 145 in the side portion 144 of the piston cover 130. The bottom surface 148 of the piston cover 130 generally is disposed on a bottom surface 166 of the groove 146. The radial protrusion 164' extends longitudinally and radially outwardly into the top portion of the groove 162. The second radial protrusion 164" extends from the bottom of the first radial protrusion 164' longitudinally and radially outwardly into the bottom portion of the groove 162. Thus, the attachment part 162 forms a type of step structure that as the attachment part extends in a longitudinal direction, the attachment part steps outwardly in the radial direction. This type of step structure locks the piston cover 130 to the piston body 128 preventing the piston cover 130 from being separated from the piston body 128 and/or moving longitudinally relative to the piston body 128.

As can be understood, the attachment part 164 enables the piston cover 130 to be integrally formed with the piston body 128, since it is completely received in the piston body 128. To this end the bottom surface 166 of the groove 146 comprises an attachment portion recess 162. The piston body 128 is formed around the attachment portion 164 and adjacent to the piston cover 130.

FIG. 13 further shows an annular projection 200 arranged at the rear side 148 of the piston cover 130. The annular projection 200 projects into a recess 202 that is arranged in the top end 140' of the piston body 128. The annular projection 200 cooperates with the recess 202 as a type of alignment member on activation of the valve member 152. The alignment member namely ensures that on releasing a pressure at the valve member 152, i.e. when the piston cover 130 is moved back towards the piston body 128 along the longitudinal axis A, the piston cover 130 aligns correctly with the piston body 128 so that no gap is present between the top end 140' and the rear side 148. The presence of such a gap could enable air to come into contact with the material M, M' stored within the cartridge 10 such that the material M, M' could degrade faster over time in comparison to no air being present.

The side portion 144 of the piston cover 130 has an grooves or recesses 180 that generally extend from the front side 150 of the piston cover 130 in a longitudinal direction toward the rear side 148 the piston cover 130 adjacent to or aligned with the attachment part 164.

Figure 15:
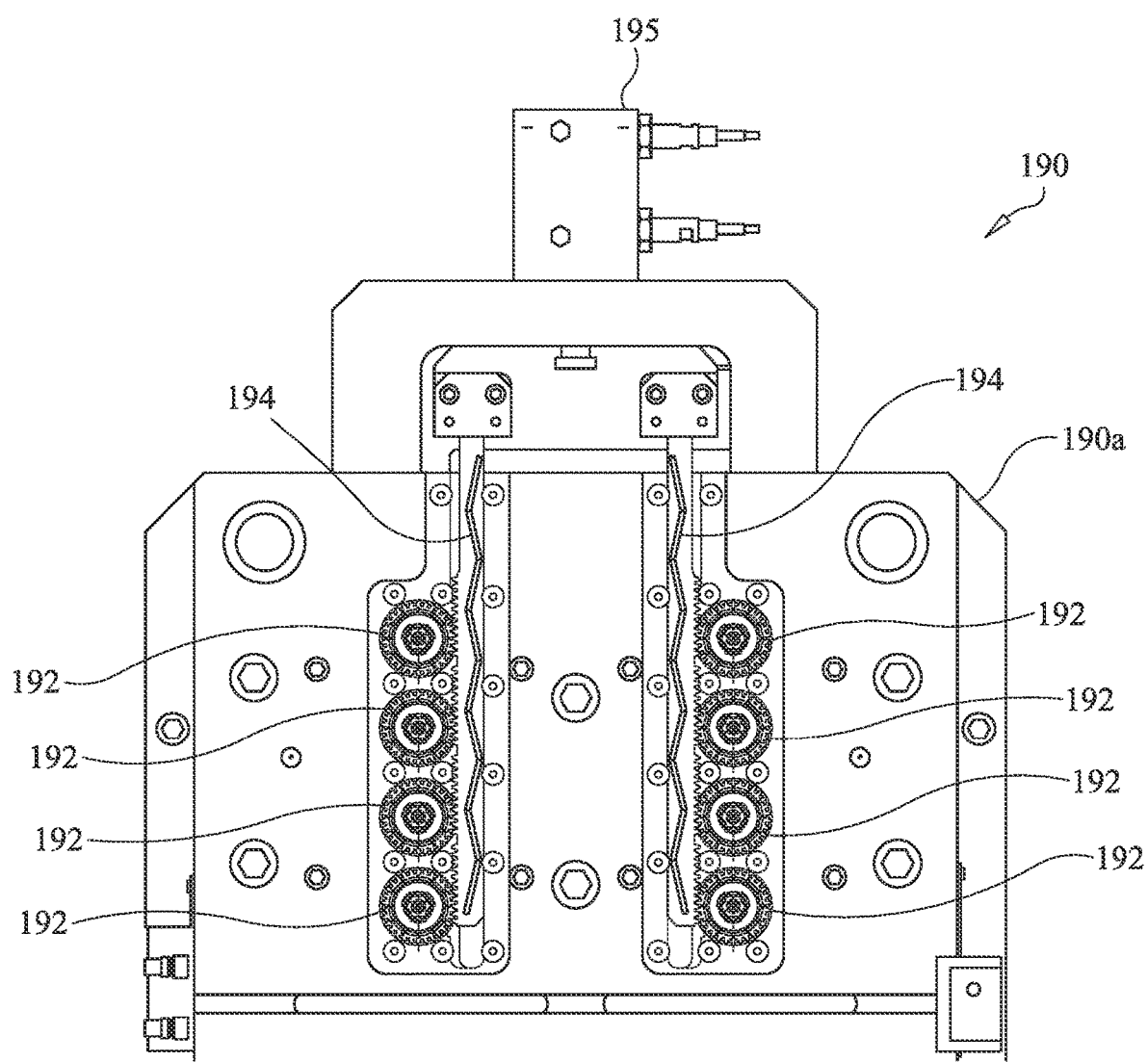
FIG. 15 is an elevational view of a portion of the molding device configured to form the piston cover of FIG. 10.
Figure 16:
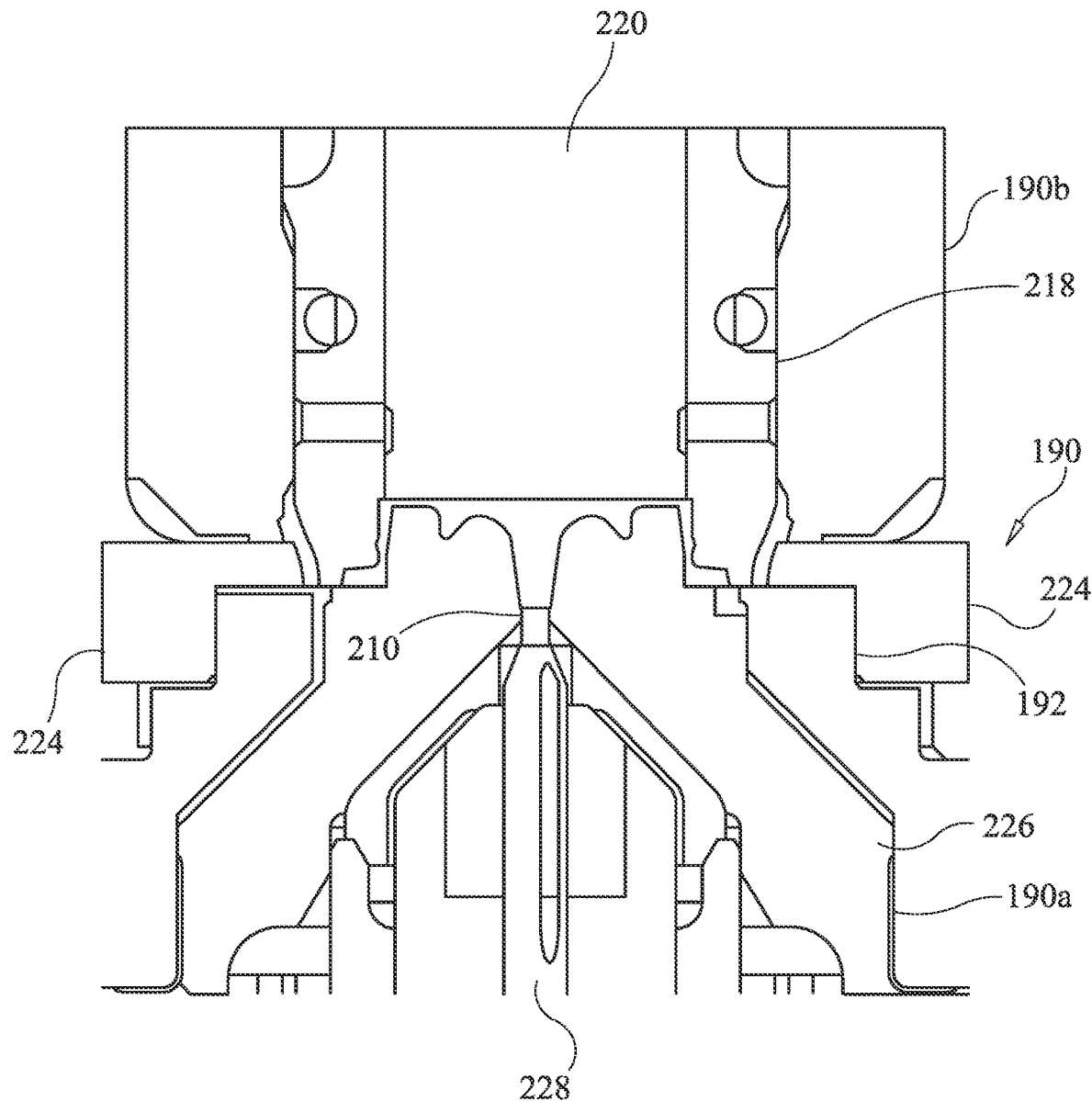
FIG. 16 is a cross sectional view of the modeling device configured to form the piston cover of FIG. 10.
Figure 17:
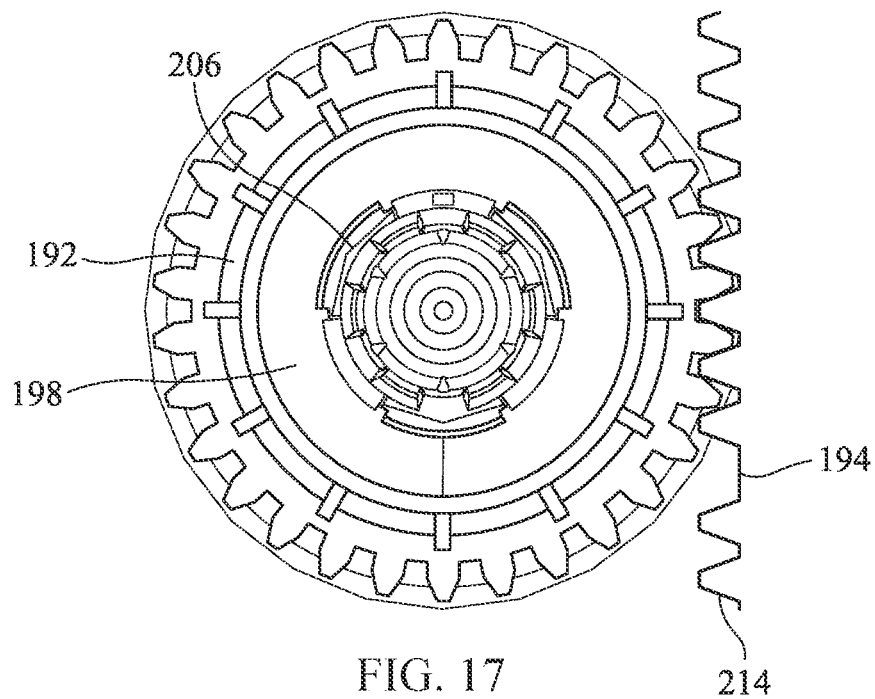
FIG. 17 is an enlarged view of one of the molds from the molding device of FIG. 15.
Figure 18:
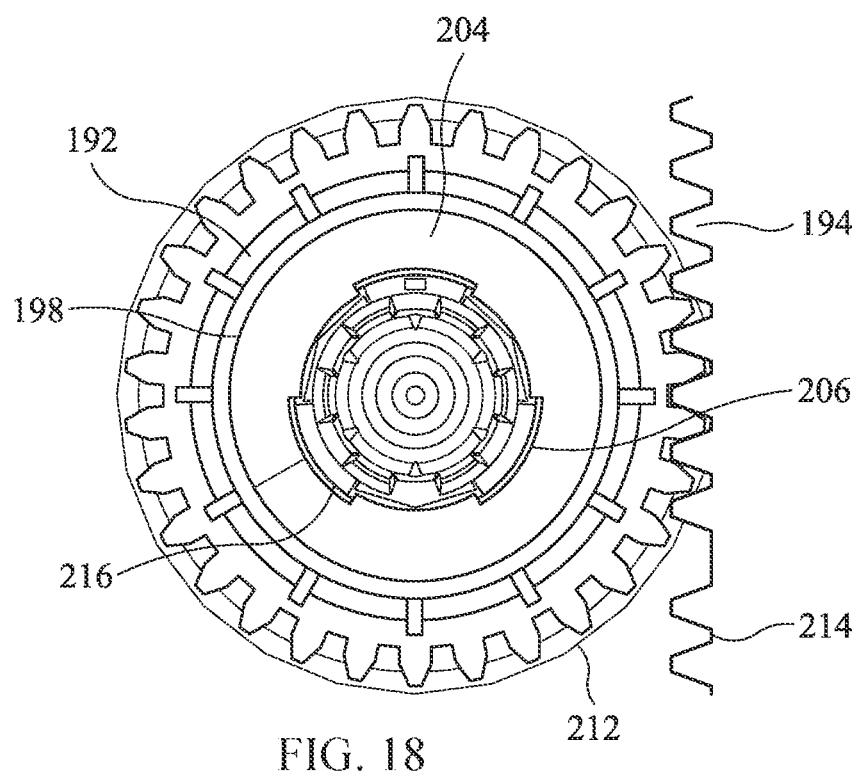
FIG. 18 is an enlarged view of the mold of FIG. 17 in the open position.

FIGS. 15 and 16 show a molding device (injection mold) 190 for piston cover 130 of the two-component piston 116 discussed above. The molding device includes an injection side 190a and an ejector side 190b. The injection mold 190 comprises a plurality of molding chambers 192 and longitudinal members 194 and a hydraulic input 195 that is configured to longitudinally move the longitudinal members. As can be understood, the attachment members of the cover are undercuts (i.e., protrusions formed in a shape that will under normal mold procures prevent withdrawal of the molded piece from a one-piece mold).

The ejector side 190b incudes an ejector 218 and a core 220. The ejector 218 and the core 220 are configured to form the outer surfaces and contours of the side portion 144 and front side 150 the piston cover 130. The ejector 218 also slides 224, as can be understood in the art. The injector 190a includes gear, a core 226 and a closure needle 228 that is configured to inject the material for forming the piston cover 130 is injected through the injection portion 210.

Accordingly, the molding device 190 is configured to form the piston cover 130 and is further designed to enable the piston cover 130 to be removed even though the attachment members 164 are undercuts. Thus, as shown in FIGS. 16-19, the molding chambers 192 for each of the piston covers 130 includes an inner member 196 and an outer member 198. The outer member includes a top portion 198a and a bottom portion 198b.

The bottom portion 198b along with the inner member 196 generally forms the attachment part 164 and includes radial teeth 212 that mesh with the longitudinal teeth 214 of the longitudinal member 194. The bottom portion 198b includes openings 216 that correspond to the attachment parts 164 and are sized and configured to enable the attachment parts 164 to be removed in the longitudinal direction of the piston cover 130.

Figure 19:
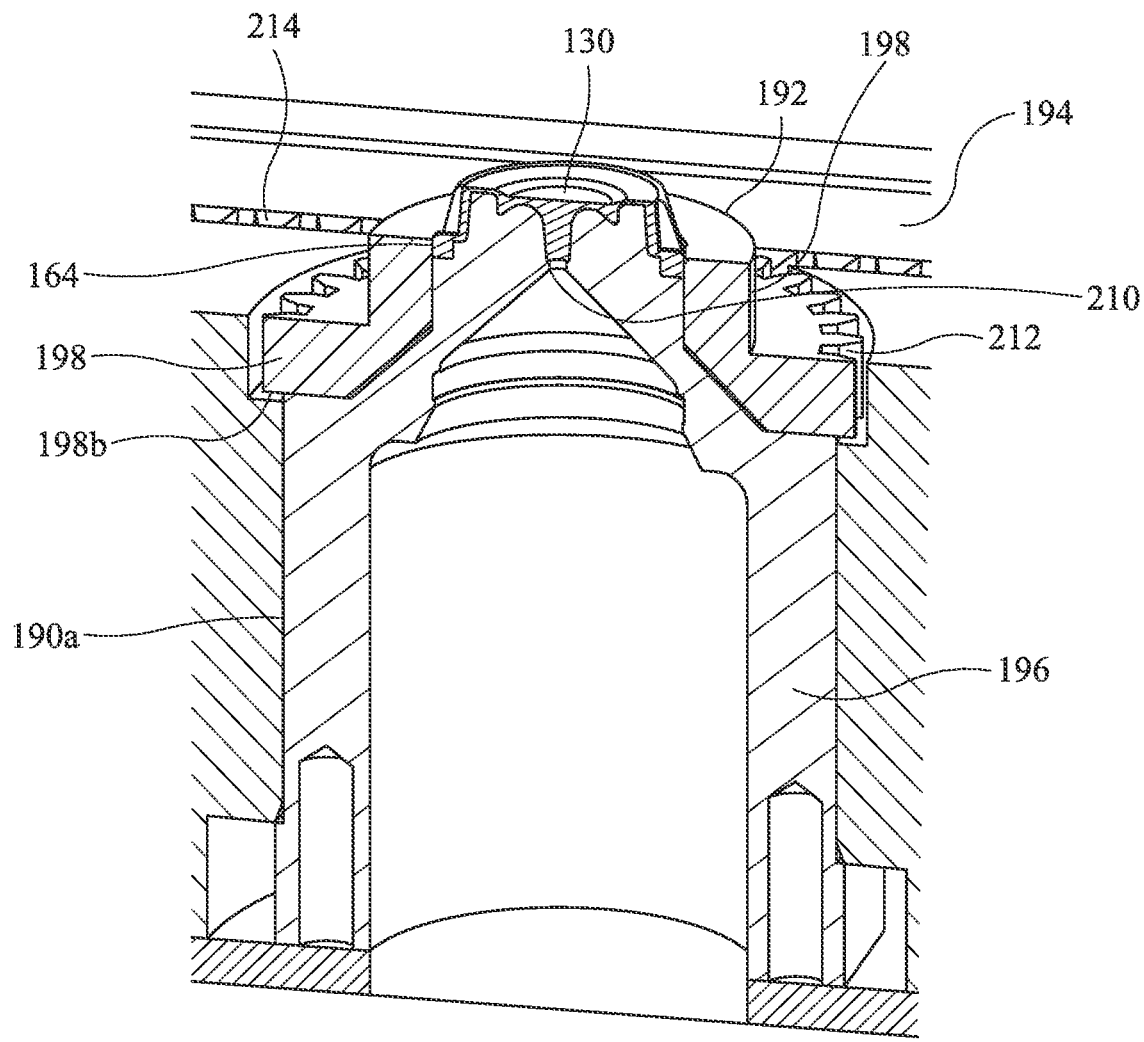
FIG. 19 is a cross sectional view of the mold of FIG. 17.
Figure 20:
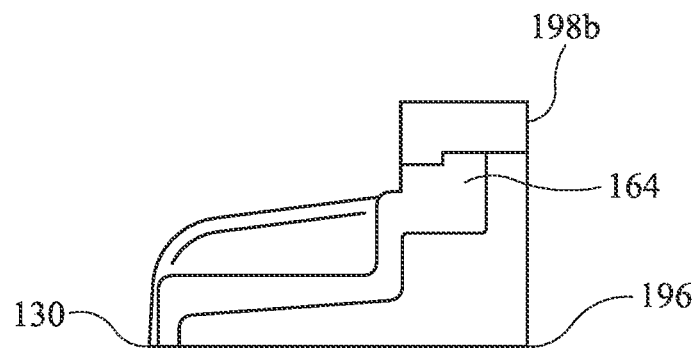
FIG. 20 is a partial view of the mold of FIG. 17.
Figure 21:
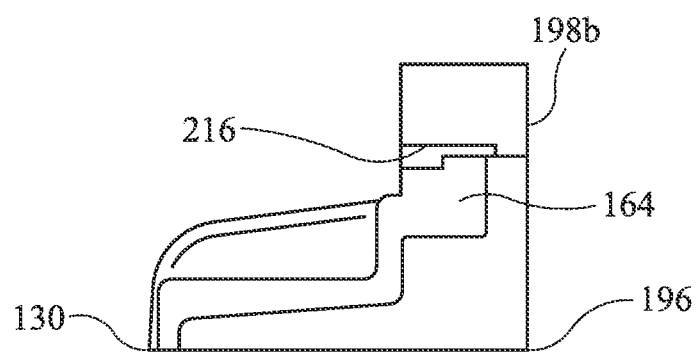
FIG. 21 is a partial view of the mold of FIG. 18.
Figure 22:
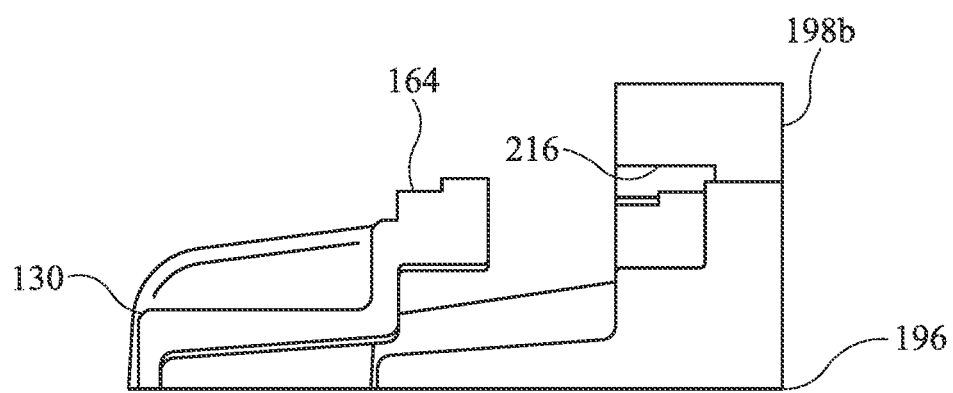
FIG. 22 is a partial view of the mold of FIG. 18 with the piston cover being removed.

The injection molding material is introduced into the first mold 192 at the respective temperatures and pressures typically used for the material of the piston cover 130 via the injection portion 210. The longitudinal members 194 are then actuated by the hydraulic input 195 to rotate the molding chambers 192. That is, as the longitudinal members 194 are moved in a longitudinal direction, the teeth 214 on the longitudinal members 194 engage the teeth 212 on the molding chambers 192 causing the molding chambers 192 to rotate. This rotation causes the openings 216 in the bottom portion to be exposed and enables the removal of the piston cover 130, as shown in FIGS. 19-21. In other words, the openings 216 in the bottom portion enable the attachment members 164, which are undercuts to be removed from the mold 192 while still being a unitary one piece molded member with the remainder of the piston cover 130.

Similar to the embodiments described herein, the injection mold 90 further comprises a second mold 96 for the piston body 28. On injection molding the piston 116, the piston cover is initially molded in the first mold 92 and subsequently forms a part of the second mold 96.

The second mold 96 comprises a second injection channel 98 forming a second point of injection used for the injection of molding material for the piston body 28. The second point of injection is present in a region of a part of the second mold 96 for an outer peripheral wall 57 of the piston body 28.

What is claimed:

1. A two-component piston for a cartridge, the two-component piston comprising:
a piston cover having a radially extending attachment portion, a rear side and a front side; and
a piston body including a front side and a rear side,
the rear side of the piston cover arranged adjacent to at least a part of the front side of the piston body and comprising a valve member configured and arranged to be received within the piston body and to extend into the piston body towards the rear side of the piston body, the piston cover configured to move relative to the piston body upon actuation of the valve member, and the piston cover being non-releasably connected to the piston body by a part of the piston body being overmolded to the radially extending portion of the attachment portion of the piston cover, the attachment portion extending longitudinally in a direction of the rear side of the piston body and the radially extending portion of the attachment portion extending in a substantially perpendicular direction to a longitudinal direction.

2. The piston in accordance with claim 1, wherein the attachment portion is a first attachment portion of a plurality of attachment portions.

3. The piston in accordance with claim 2, wherein a second attachment portion is radially opposed to the first attachment portion.

4. The piston in accordance with claim 3, wherein the plurality of attachment portions includes at least four attachment portions evenly disposed about a perimeter of the piston cover.

5. The piston in accordance with claim 1, wherein the piston body comprises an annular groove at the front side, the piston cover extends into the annular groove and up to a base of the annular groove, and the attachment portion projects from the piston cover at the base of the annular groove into the piston body.

6. The piston in accordance with claim 5, wherein the base of the annular groove of the piston body comprises a recess in which at least a part of the attachment portion is received.

7. The piston in accordance with claim 5, wherein the piston cover comprises a central region and a side portion, the side portion extending from the central region at least generally in a direction of the second side and into the annular groove and up to the base of the annular groove, wherein a front side of the side portion comprises at least one recess.

8. The piston in accordance with claim 1, wherein the valve member is a valve pin.

9. The piston in accordance with claim 1, wherein the part of the piston body that is overmolded to the radially extending portion and a remaining part of piston body are integrally formed in an injection molding process, or the attachment portion and the piston cover are integrally formed in an injection molding process.

10. A cartridge comprising:
an outlet;
a chamber; and
a piston in accordance with claim 1, the piston being arranged in the chamber.

11. The cartridge in accordance with claim 10, further comprising a flowable material arranged in the chamber.

12. A method of forming a two-component piston, the method comprising:
injecting a material into a mold having a first mold and a second mold to form a piston cover, the second mold being rotatable along a longitudinal axis relative to the first mold;
rotating the second mold relative to the first mold to expose an opening in a surface of the second mold;
removing the piston cover by passing an undercut portion of the piston cover through the opening; and
attaching the piston cover to a piston body and overmolding the piston body to the undercut portion of the piston cover,
the undercut portion being an attachment portion that extends longitudinally in a direction of a rear side of the piston body and a radially extending portion of the attachment portion extends is a substantially perpendicular direction to a longitudinal direction.

13. The method according to claim 12, wherein the second mold includes gear teeth to enable the rotating the second mold relative to the first mold.

14. The method according to claim 13, wherein the gear teeth are configured to engage teeth on a longitudinally extending bar.

15. The method in accordance with claim 12, wherein the attachment portion is a first attachment portion of a plurality of attachment portions.

16. The method in accordance with claim 15, wherein a second attachment portion of the plurality of attachment portions is radially opposed to the first attachment portion.

17. The method in accordance with claim 15, wherein the plurality of attachment portions includes at least four attachment portions evenly disposed about a perimeter of the piston cover.

18. A two-component piston for a cartridge, the two-component piston comprising:
a piston cover having a radially extending attachment portion, a rear side and a front side; and
a piston body including a front side and a rear side,
the rear side of the piston cover arranged adjacent to at least a part of the front side of the piston body and comprising a valve member configured and arranged to be received within the piston body and to extend into the piston body towards the rear side of the piston body, the piston cover configured to move relative to the piston body upon actuation of the valve member, and the piston cover being non-releasably connected to the piston body by a part of the piston body being overmolded to the radially extending portion of the attachment portion of the piston cover,
the piston body comprising an annular groove at the front side, the piston cover extending into the annular groove and up to a base of the annular groove, and the attachment portion projecting from the piston cover at the base of the annular groove into the piston body.

19. A two-component piston for a cartridge, the two-component piston comprising:
a piston cover having a radially extending attachment portion, a rear side and a front side; and
a piston body including a front side and a rear side,
the rear side of the piston cover arranged adjacent to at least a part of the front side of the piston body and comprising a valve member configured and arranged to be received within the piston body and to extend into the piston body towards the rear side of the piston body, the piston cover configured to move relative to the piston body upon actuation of the valve member, and the piston cover being non-releasably connected to the piston body by a part of the piston body being overmolded to the radially extending portion of the attachment portion of the piston cover, the radially extending attachment portion being a first attachment portion, a second attachment portion radially opposed to the first attachment portion, and the plurality of attachment portions including at least four attachment portions evenly disposed about a perimeter of the piston cover.

\* \* \* \* \*